US008471872B2

(12) United States Patent
Soeda

(10) Patent No.: US 8,471,872 B2
(45) Date of Patent: Jun. 25, 2013

(54) IMAGE DISPLAY CONTROLLING APPARATUS, IMAGE DISPLAY CONTROLLING METHOD AND INTEGRATED CIRCUIT

(75) Inventor: Junichiro Soeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/120,545

(22) PCT Filed: Jun. 28, 2010

(86) PCT No.: PCT/JP2010/004274

§ 371 (c)(1),
(2), (4) Date: Mar. 23, 2011

(87) PCT Pub. No.: WO2011/024363

PCT Pub. Date: Mar. 3, 2011

(65) Prior Publication Data

US 2011/0175933 A1 Jul. 21, 2011

(30) Foreign Application Priority Data

Aug. 31, 2009 (JP) ................................ 2009-200192

(51) Int. Cl.
*G06G 5/00* (2006.01)
*G06T 17/00* (2006.01)

(52) U.S. Cl.
USPC ............ 345/666; 345/619; 345/620; 345/428

(58) Field of Classification Search
None
See application file for complete search history.

(56) References Cited

U.S. PATENT DOCUMENTS

2005/0041156 A1* 2/2005 Kondo et al. ................ 348/700
2005/0219239 A1* 10/2005 Mashitani et al. ............ 345/419

FOREIGN PATENT DOCUMENTS

JP 10-301556 11/1998
JP 2001-313885 11/2001
JP 2003-256846 9/2003
JP 2003-323170 11/2003
JP 2007226761 A * 9/2007

OTHER PUBLICATIONS

International Search Report issued Aug. 3, 2010 in corresponding International Application No. PCT/JP2010/004274.

* cited by examiner

*Primary Examiner* — Ulka Chauhan
(74) *Attorney, Agent, or Firm* — Wenderoth, Lind & Ponack, L.L.P.

(57) ABSTRACT

The present invention detects a position of an object in space, and stores therein the detected position by associating with image data. When displaying an image, the present invention sets as a coordinate of a vertical axis of the display device an object position in a depth direction perpendicular to an imaging plane, and sets as a coordinate of a horizontal axis of the display device an object position in a horizontal direction parallel to the imaging plane, thereby displaying the image. According to this, not only a movement of the image, which is parallel to the imaging plane of the camera which captures the object, but also a movement in the depth direction, which is perpendicular to the imaging plane, is dynamically reproduced on a display device having a displayable region larger than the image size of a displayed video.

8 Claims, 25 Drawing Sheets

FIG. 8

800

| TIME (SECOND) | DISTANCE (M) | ANGLE (DEGREE) |
|---|---|---|
| 1 | 8.3 | 14.0 |
| 2 | 7.7 | 23.0 |
| 3 | 7.2 | 34.0 |
| 4 | 7.8 | 40.0 |
| 5 | 8.5 | 45.0 |
| 6 | 9.9 | 45.0 |
| 7 | 11.3 | 45.0 |
| 8 | 12.7 | 45.0 |
| 9 | 14.1 | 45.0 |
| 10 | 15.5 | 45.0 |

FIG. 9

900

| TIME (SECOND) | X COORDINATE (M) | Z COORDINATE (M) |
|---|---|---|
| 1 | 2.01 | 8.05 |
| 2 | 3.01 | 7.09 |
| 3 | 4.02 | 5.97 |
| 4 | 5.01 | 5.98 |
| 5 | 6.01 | 6.01 |
| 6 | 7.00 | 7.00 |
| 7 | 7.99 | 7.99 |
| 8 | 8.98 | 8.98 |
| 9 | 9.97 | 9.97 |
| 10 | 10.96 | 10.96 |

1000

| TIME (SECOND) | $U_i$ COORDINATE (DOT) | $V_i$ COORDINATE (DOT) |
|---|---|---|
| 1 | 280 | 360 |
| 2 | 296 | 358 |
| 3 | 300 | 362 |
| 4 | 114 | 364 |
| 5 | 190 | 361 |
| 6 | 260 | 363 |
| 7 | 230 | 357 |
| 8 | 180 | 366 |
| 9 | 200 | 361 |
| 10 | 212 | 372 |

FIG. 10

FIG. 11

1100

| TIME (SECOND) | $U_d$ COORDINATE (DOT) | $V_d$ COORDINATE (DOT) |
|---|---|---|
| 1 | -280.0 | 1870.5 |
| 2 | 469.8 | 2608.3 |
| 3 | 1239.3 | 3462.8 |
| 4 | 2183.4 | 3453.1 |
| 5 | 2873.2 | 3433.1 |
| 6 | 3561.4 | 2672.3 |
| 7 | 4349.5 | 1919.5 |
| 8 | 5157.6 | 1151.6 |
| 9 | 5895.8 | 397.8 |
| 10 | 6641.9 | -372.0 |

FIG. 12

1200

| TIME (SECOND) | $U_d$ COORDINATE (DOT) | $V_d$ COORDINATE (DOT) |
|---|---|---|
| 1 | 0.0 | 2242.5 |
| 2 | 749.8 | 2980.3 |
| 3 | 1519.3 | 3834.8 |
| 4 | 2463.4 | 3825.1 |
| 5 | 3153.2 | 3805.1 |
| 6 | 3841.4 | 3044.3 |
| 7 | 4629.5 | 2291.5 |
| 8 | 5437.6 | 1523.6 |
| 9 | 6175.8 | 769.8 |
| 10 | 6921.9 | 0.0 |

IMAGE DISPLAY CONTROLLING APPARATUS, IMAGE DISPLAY CONTROLLING METHOD AND INTEGRATED CIRCUIT

TECHNICAL FIELD

The present invention relates to an image display controlling apparatus for driving a display device, an image display controlling method, and an integrated circuit for use in the image display controlling apparatus.

BACKGROUND ART

Conventionally, in image display controlling apparatuses for displaying television broadcast programs, or images captured by digital still cameras or digital movie cameras, in common usage, videos have been displayed on a screen entirely. In recent years, however, as the image display controlling apparatuses have come to have large screens with high resolutions, technology has been proposed that moves and displays a captured image within a displayable region larger than the size of the captured image.

For example, Patent Literature 1 discloses technology in which motion vectors are extracted from a displayed image by performing image processing, and weighted summation and averaging of the motion vectors is performed to extract main motion information per image. If the displayed image is described in a video format, such as moving picture expert group (MPEG), which stores therein motion information, the motion vectors are extracted from the video data to extract the main motion information per image in the same manner as described above. A position of the display image is then moved within a displayable region, according to the main motion information. This technology, however, moves the display position of the image according to a movement of an object, which causes a problem that the image deviates out of the image display region during the display, ending up with failing to correctly display the image.

Patent Literature 2 discloses technology which solves the above problem. Specifically, Patent Literature 2 discloses technology that detects a scene change of an image to move the image with a reduced moving amount within a displayable region so that the image present at the center of the deviation of the movement in the scene is displayed at the center of the displayable region, and so that the image is displayed within the displayable region.

CITATION LIST

Patent Literature

[Patent Literature 1] Japanese Laid-Open Patent Publication No. 10-301556

[Patent Literature 2] Japanese Laid-Open Patent Publication No. 2003-256846

SUMMARY OF THE INVENTION

Problems to be Solved by the Invention

In the conventional technologies, a display position of the image is moved according to the motion vectors of the display image and thus, it is possible to reproduce a movement of an object in a direction parallel to a imaging plane of a camera which captures images to be displayed by the image display controlling apparatus. However, it is difficult to reproduce a movement of the object in an optical axis direction (a depth direction) of the camera. Reasons for this will be described in detail by way of illustrations and examples shown in FIGS. 23 through 25.

FIG. 23 is a diagram illustrating an example of a coordinate system of a camera, which captures images to be displayed by an image display controlling apparatus, and movements of an object in the coordinate system. An X axis in FIG. 23 indicates the right direction of an imaging plane of the camera, a Y axis indicates the downward direction of the imaging plane, and a Z axis indicates an optical axis direction (i.e., a depth direction) of the camera. It is assumed that the X axis is fixed to the horizontal direction of the ground, and the Y axis is fixed to the vertically downward direction of the ground. Also, it is assumed that, as indicated by a dotted line, the object moves approaching toward the camera, and that images shown in rectangular balloons are captured at time points each shown as a black circle on the dotted line. Numbers are attached at upper left corners of the images to identify each image. In later-described FIG. 24 and FIG. 25, images having the same numbers as the images shown in FIG. 23 correspond to each other.

FIG. 24 shows images which are acquired as described above and displayed by means of the conventional technology. In the example shown in FIG. 23, motion vectors occur also due to the object being enlarged in the image. However, since components of the motion vectors are oriented in multiple directions, when weighted summation of the motion vectors is performed to determine the average as disclosed in Patent Literature 1, many of the components cancel each other out. Therefore, the motion vectors due to the movement of the object in the X and Y directions are mainly detected. In the example shown in FIG. 23, the object does not move in up-down directions such as jumping, and therefore motion information in the Y direction is hardly detected from the image.

Therefore, in the conventional technology, although the object also moves approaching toward the camera, the image is displayed as if the image merely moves mainly in the horizontal direction (the X direction) of a large screen as shown in FIG. 24. Therefore, there is a problem that the conventional technologies reproduce merely part of the movement of the object, and thus the display lacks for dynamics.

Therefore, an objective of the present invention is to reproduce a movement of an object in space, particularly, a movement of the object in the depth direction by displaying an image at a display position, corresponding to an object position in space, in a displayable region larger than a display image. More specifically, the objective is to dynamically display the object by representing the movement in the depth direction in terms of a movement in up-down directions of a display image as shown FIG. 25.

Solution to the Problems

In order to achieve the above objectives, the image display controlling apparatus of the present invention drives a display device, and includes the following components: a content management unit for storing therein image data of a video and positional information of the object described in an orthogonal coordinate system in which a camera, which captures the object, is used as a reference, by associating with one another on a frame-by-frame basis; a display position determination section for determining a display position of the video by associating the coordinate of the object in the depth direction in the coordinate system with a vertical axis coordinate of the display device, and associating the coordinate of the object in a horizontal direction of the coordinate system with a horizontal axis coordinate of the display device; and a display device controlling section for transmitting to the display device a signal to display the video at the display position determined by the display position determination section.

Advantageous Effects of the Invention

Having the configuration described above, the present invention allows the reproduction for display not only of the movement of the object parallel to the imaging plane of the camera, which captures the object, but also of the movement in the depth direction perpendicular to the imaging plane of the camera. Therefore, a user is able to recognize the movement of the object in the depth direction perpendicular to the imaging plane of the camera.

BRIEF DESCRIPTION OF THE DRAWINGS

FIG. 8 is a diagram showing an example of positional information of the object, which is obtained by a distance sensor and an angle sensor, and generated by a position generating section 103.

FIG. 9 is a diagram showing an example of positional information of the object in camera coordinates, which is generated by the position generating section 103.

FIG. 10 is a diagram showing an example of positional information of the object within an image, which are detected by an image analysis section 102.

FIG. 11 is a diagram showing an example of provisional display positions 2.

FIG. 12 is a diagram showing an example of display positions.

FIG. 14 is a diagram showing examples of a movement trajectory and the input images of the object, when the object is captured in a state where an object position in the image is abruptly changed because of camera shake or the like.

DESCRIPTION OF EMBODIMENTS

First Embodiment

Figure 1:
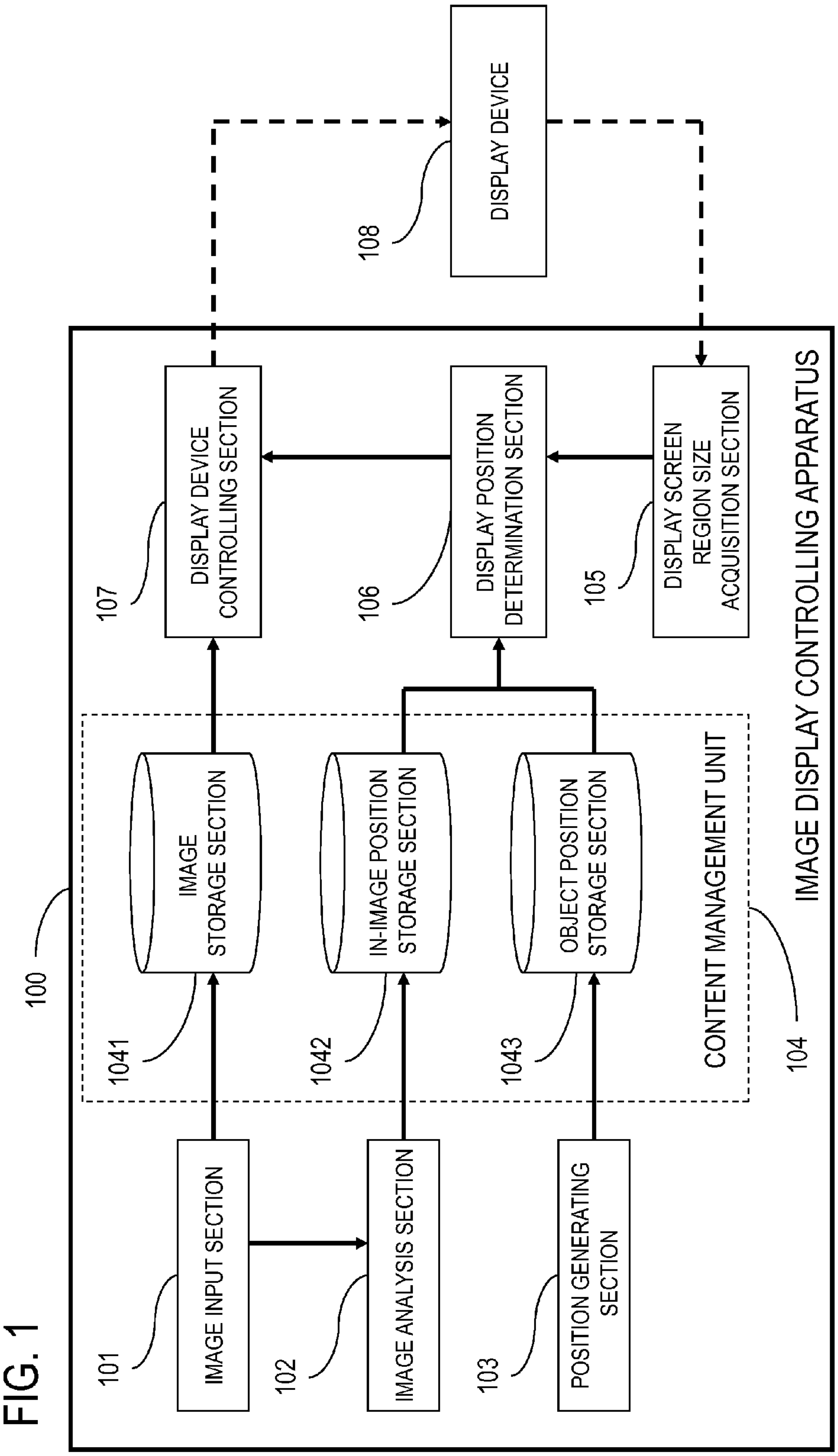
FIG. 1 is a block diagram showing a configuration of an image display controlling apparatus according to a first embodiment of the present invention.

Hereinafter, an image display controlling apparatus according to a first embodiment of the present invention is described, with the accompanying drawings. FIG. 1 is a block diagram illustrating a configuration of the image display controlling apparatus according to the present embodiment.

An image display controlling apparatus 100 of the present embodiment includes an image input section 101, an image analysis section 102, a position generating section 103, a content management unit 104, a display screen region size acquisition section 105, a display position determination section 106, and a display device controlling section 107.

The image input section 101 receives and encodes a video stream. The image input section 101 can include, for example, a camera function.

The image analysis section 102 analyzes image data obtained by the image input section 101 to detect an object position in the image. The object indicates a person, an animal, a vehicle, or the like that is capable of moving. The image analysis section 102 may analyze the image data at a time when the image data is inputted, or may analyze the image data by reading out the image data stored by an image storage section 1041 when a central processing unit is detected as being idle for a certain amount of time or longer. As a detection method, a method is used of detecting the object from the image data by means of a face recognition process, which, for example, previously has learned a face pattern of the object. Alternatively, a method may be used, in which a user designates an object, and the same object is then extracted from another image as well by means of image analysis to identify the object position. The object may be identified based on not only the face, but also a color or a pattern of a garment the object is wearing. The object position detected by the image analysis section 102 is represented by coordinates of the barycenter of a region in which the face is displayed, or coordinates of the barycenter of a region in which the object is displayed.

Figure 2:
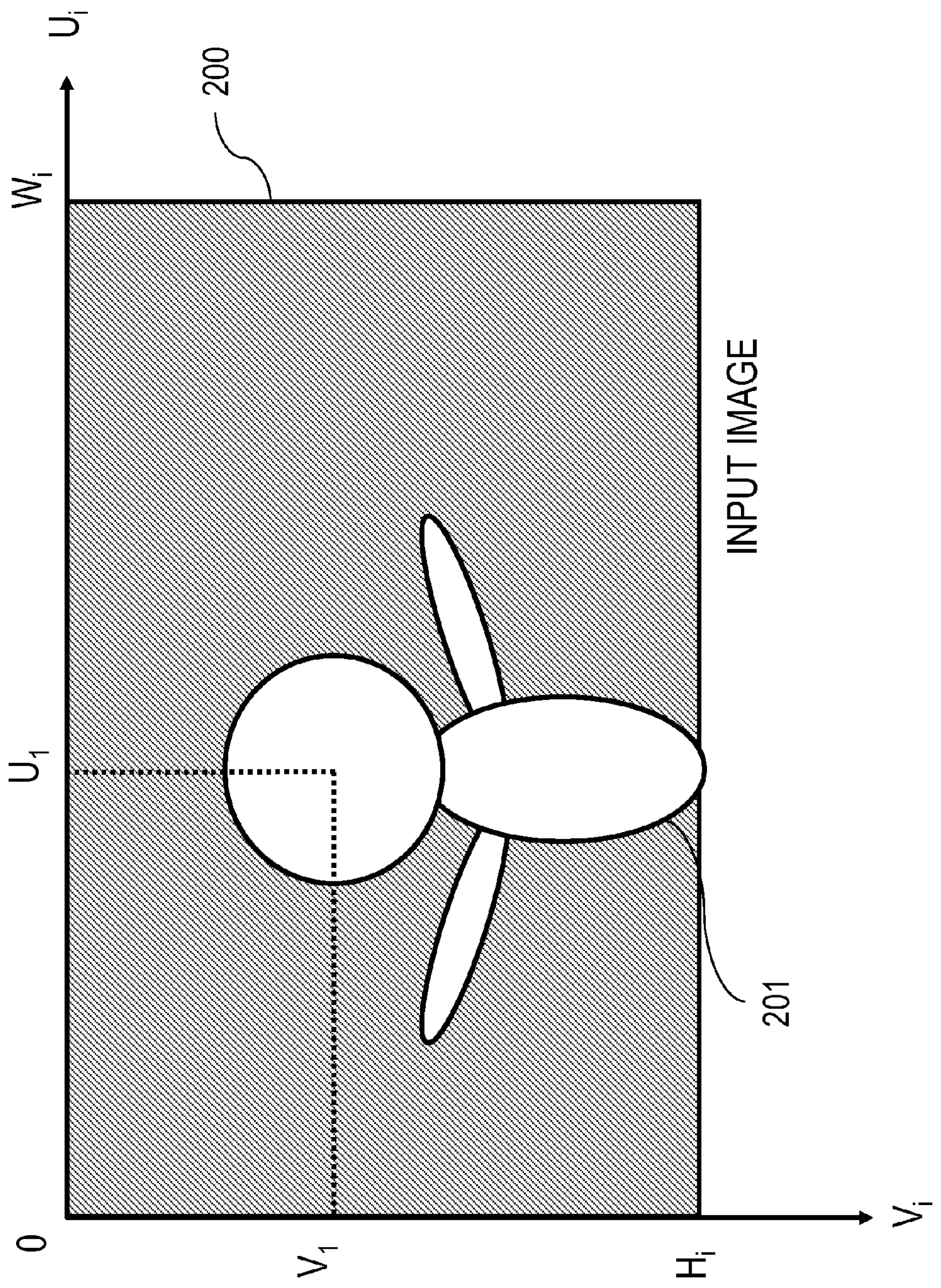
FIG. 2 is a diagram showing an example of an object position within an input image.

FIG. 2 is a diagram showing a position of an object 201 within an input image 200. In an orthogonal coordinate system where the horizontal direction of the image is represented by a $U_i$ axis, and the vertical direction of the object is represented by a $V_i$ axis, the image size is represented by ($W_i$, $H_i$). In the case of the input image having VGA size, the image size is represented by (640, 480). In this example, the barycenter of the region in which the face is displayed is assumed to be a position of the object 201, and thus, the position within the input image is represented by ($U_1$, $V_1$).

The position generating section 103 receives a geographical position of the object, which is detected by a position detection method which will be described later, to generate a position of the object in a coordinate system, in which a camera, which captures the object, is used as reference (hereinafter, referred to as camera coordinate system). The position generating section 103 then outputs to an object position storage section 1043 (described later) the generated object position in the camera coordinate system. Examples of the position detection method of detecting the geographical position of the object are, for example, a method that utilizes a distance sensor and an angle sensor to acquire a distance and an angle, between the object and the image display controlling apparatus, thereby determining the position, a method that utilizes GPS to detect the position, and a method that detects the position by utilizing an RFID tag in a state where a reader of the RFID tag is previously disposed in space.

Figure 23:
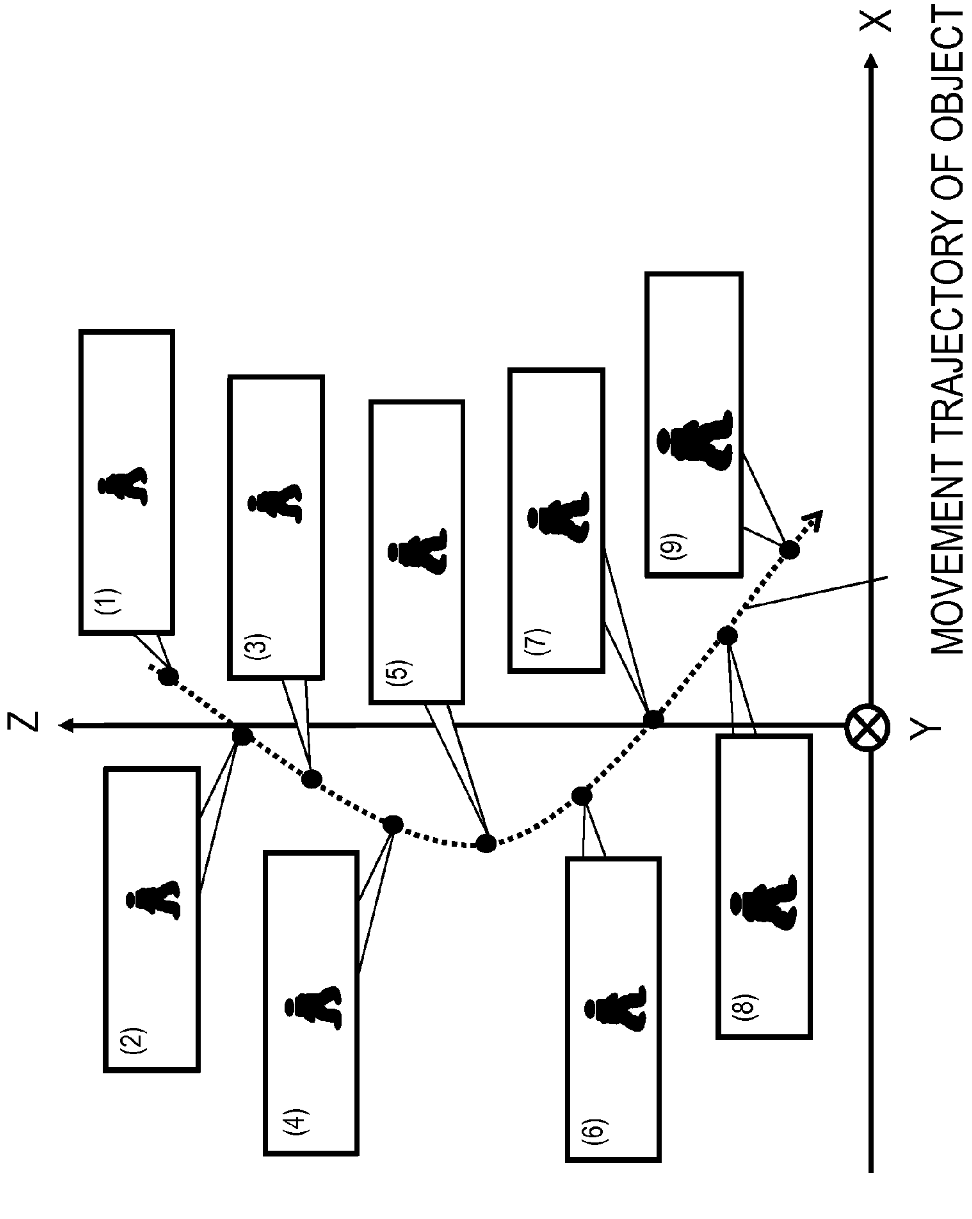
FIG. 23 is a diagram showing example of the movement trajectory and the input image of the object, when the object is captured.
Figure 24:
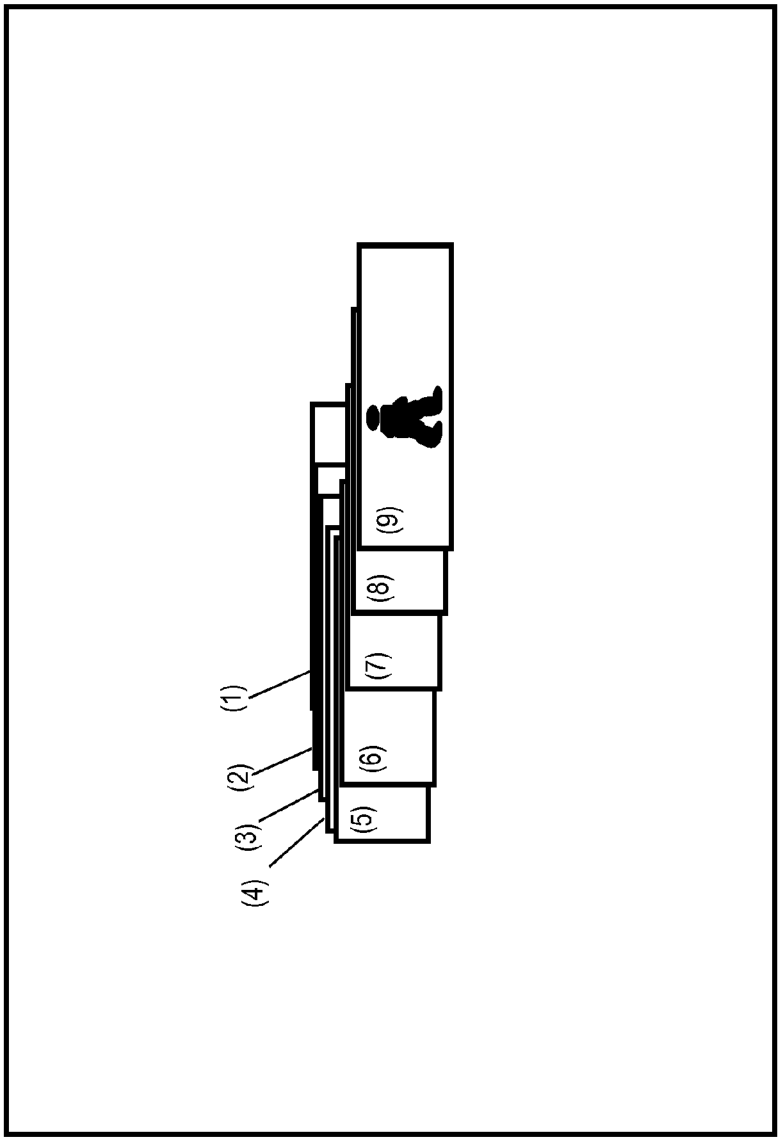
FIG. 24 is a diagram showing an example of the image in which the input images shown in FIG. 23 are displayed by an image display controlling apparatus of a conventional invention.
Figure 25:
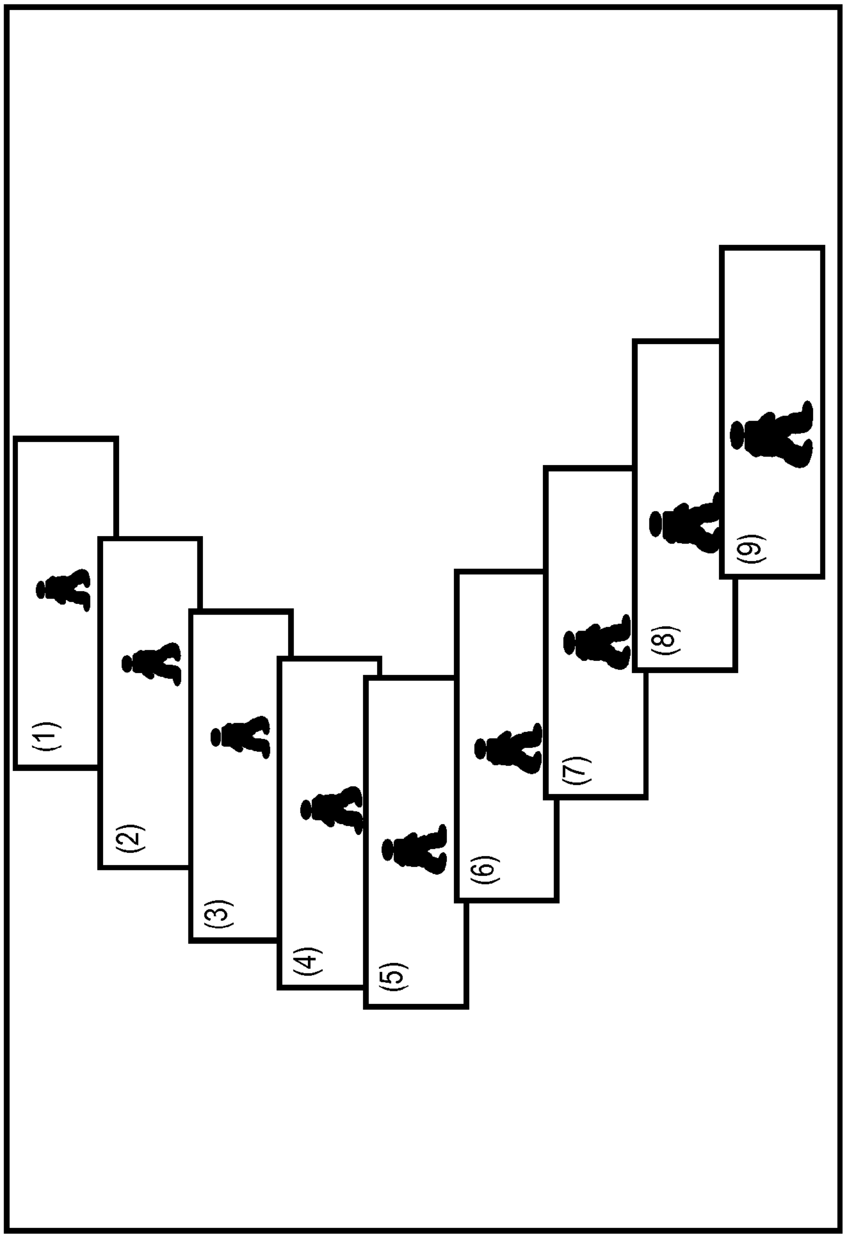
FIG. 25 is a diagram showing an example of the image in which the input images shown in FIG. 23 are displayed by the image display controlling apparatus according to the first embodiment of the present invention.

Next, the camera coordinate system is described. As shown in FIG. 23, this coordinate system has an X axis in the right direction of an imaging plane of the camera, a Y axis in the downward direction of the imaging plane, and a Z axis in a view direction (i.e., the depth direction) of the camera. Since a user usually shoots an image, directing the camera in the horizontal direction, the X axis and Z axis may be considered to be substantially on a horizontal plane. Therefore, hereinafter, in the present embodiment, it is assumed that the X axis and Z axis are present on the horizontal plane. Also, when the user shoots one scene, the camera is sometimes panned. In this case, a certain reference direction is defined as a positive direction of the Z axis, and an axis on the horizontal plane, which is perpendicular to the reference direction, is defined as the X axis. The reference direction may be, for example, north direction, or an optical axis direction of the camera at a time when recording starts, or ends.

If the positional information of the object, which is detected by the position detection method described above, is in a different coordinate system, for example, which is based on latitude or longitude, the position generating section 103 additionally determines positional information of the camera and the optical axis direction of the camera in that coordinate system, and performs parallel movement and rotation to generate the positional information of the object in the camera coordinate system. If the inputted positional information of the object is represented by the polar coordinate system, even if the camera is used as reference, the position generating section 103 generates positional information of the object in a camera coordinate system based on an orthogonal coordinate system.

The content management unit 104 includes an image storage section 1041, an in-image position storage section 1042, and an object position storage section 1043. The image storage section 1041 stores therein the image data encoded by the image input section 101. The in-image position storage section 1042 stores therein the positional information of the object within the image region, which is detected by the image analysis section 102, in association with the image data on a frame-by-frame basis. The object position storage section 1043 stores therein the positional information in the camera coordinate system, which is generated by the position generating section 103, in association with the image data on the frame-by-frame basis. As shown in an example to be described later, it is preferable that the object position storage section 1043 stores therein the positional information in terms of two-dimensional values including an X coordinate and a Z coordinate.

Figure 3:
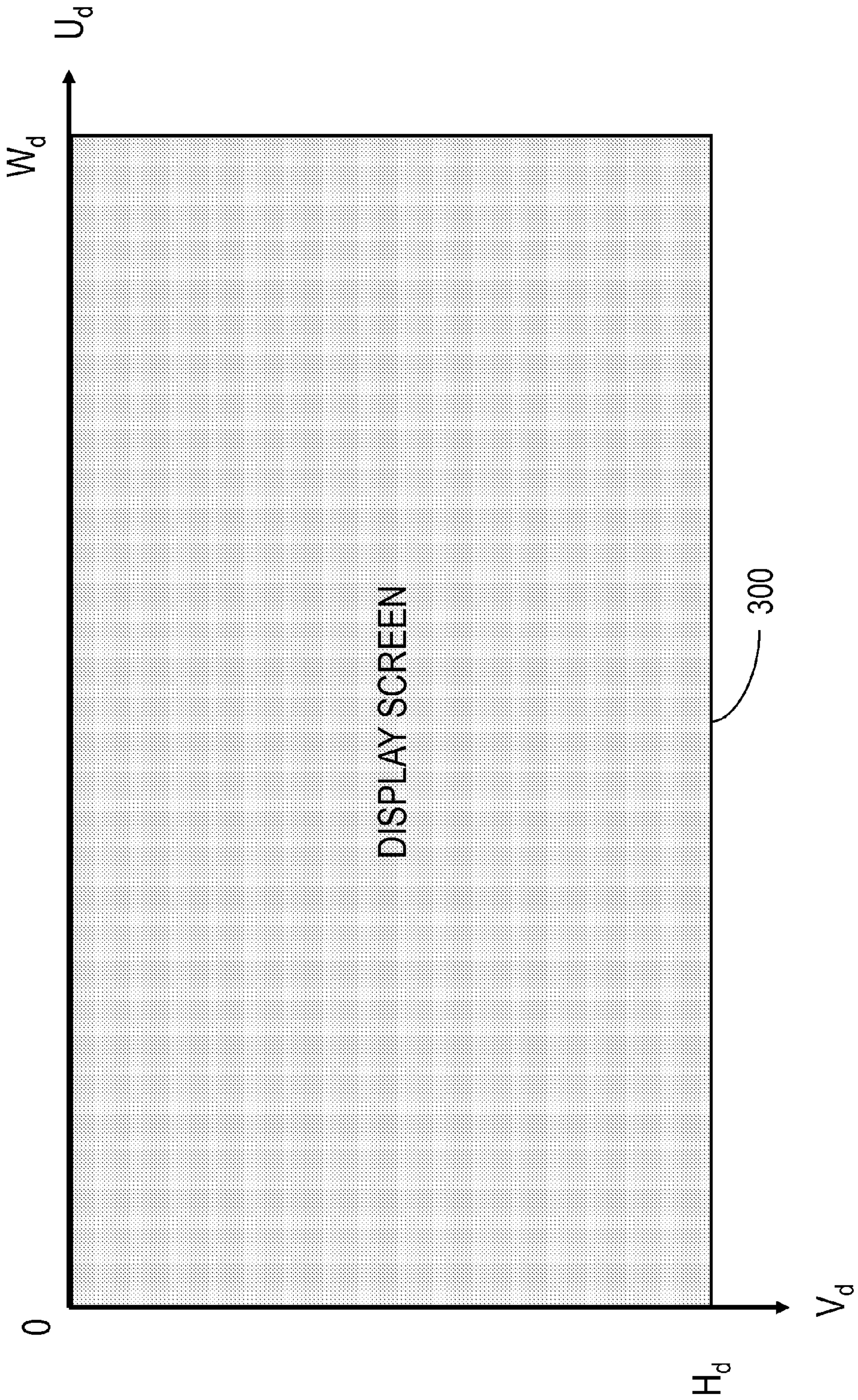
FIG. 3 is a diagram showing an example of reference coordinates of a display device.

The display screen region size acquisition section 105 acquires a screen size of a display device. This acquisition method may read out data, which is preset in the image display controlling apparatus 100, or may acquire the screen size from a display device 108 (described later) via various interfaces, such as a high-definition multimedia interface (HDMI). The region size of this display screen is represented by, for example, ($W_d$, $H_d$) in the orthogonal coordinate system where the horizontal direction of the image to be displayed by the display device is represented by a $U_d$ axis, and the vertical direction is represented by a $V_d$ axis, as shown in FIG. 3. For example, the region size of a display device complying with Super Hi-Vision format is represented by (7680, 4320).

The display position determination section 106 determines a display position of the object on the display device 108 by utilizing the positional information of the object within the image region, which is stored by the in-image position storage section 1042, the positional information of the object in the camera coordinate system, which is stored by the object position storage section 1043, and screen size information of the display device, which is acquired by the display screen region size acquisition section 105. Detailed process steps performed by the display position determination section 106 will be described later.

The display device controlling section 107 transmits a signal to the display device 108 to display the image data stored by the image storage section 1041 at the display position determined by the display position determination section 106. The display device 108 indicates various display devices, such as a liquid crystal display, a plasma display device, a cathode-ray-tube display device, and an organic EL (Electro-Luminescence) display device. Although the present embodiment has such a configuration that the display device 108 is provided external to the image display controlling apparatus 100, the display device 108 may be added as a component of the image display controlling apparatus 100.

Figure 4:
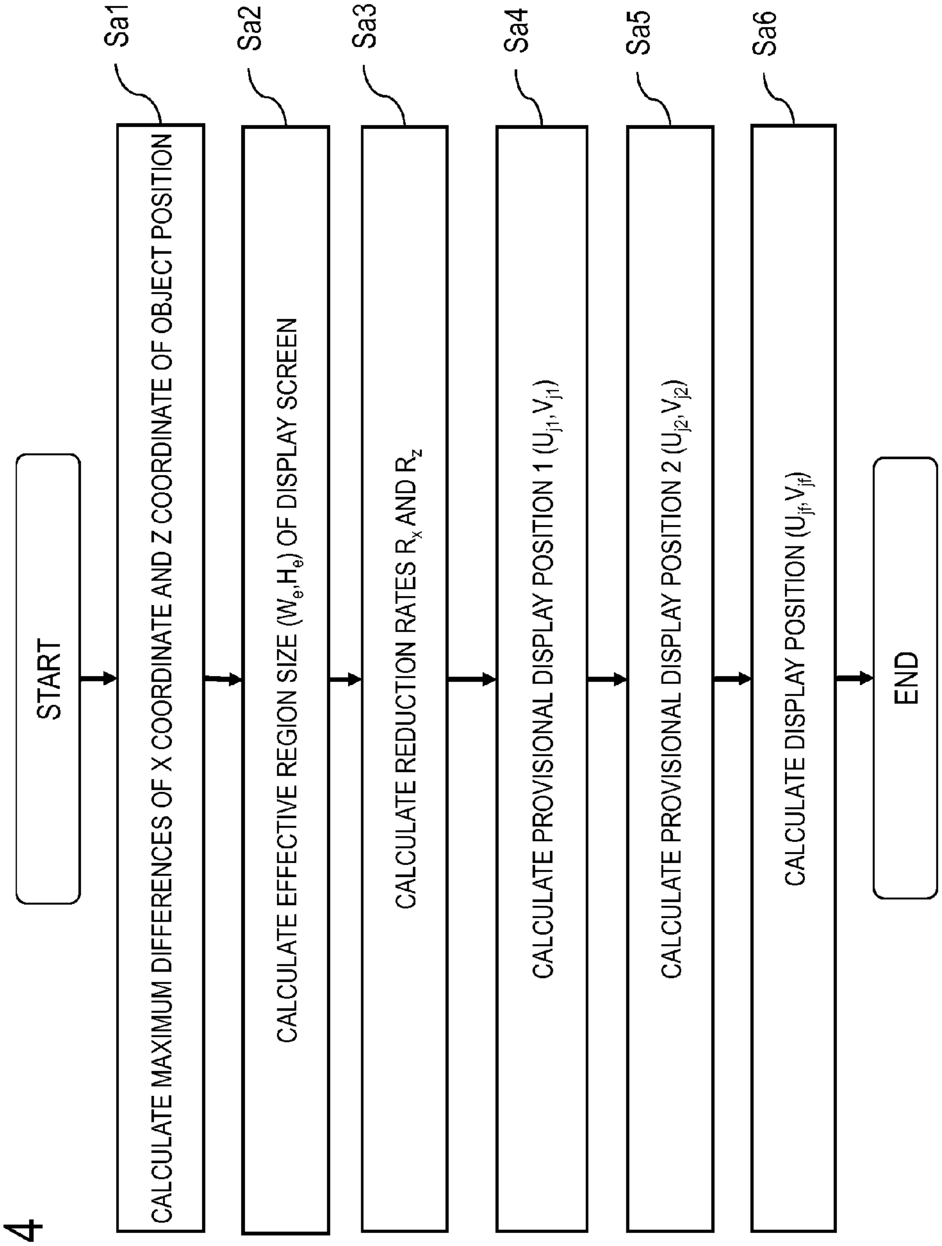
FIG. 4 is a flowchart of process steps performed by a display position determination section 106 of the first embodiment.

Next, a process flow of the display position determination section 106 of the present invention is described in detail. FIG. 4 is a diagram illustrating a flowchart of process steps of determining the display position, which are performed by the display position determination section 106.

First, the display position determination section 106 calculates maximal difference of each X coordinate and Z coordinate of the object positions stored by the object position storage section 1043 (Sa1). The maximal difference of the X coordinate and the maximal difference of the Z coordinate are hereinafter represented by $D_x$ and $D_z$, respectively. A maximal value and a minimal value of the X coordinate, which are determined when a difference $D_x$ is calculated, are represented by $X_{max}$ and $X_{min}$, respectively. A maximal value and a minimal value of the Z coordinate, which are determined when a difference $D_z$ is calculated, are represented by $Z_{max}$ and $Z_{min}$, respectively.

Figure 5:
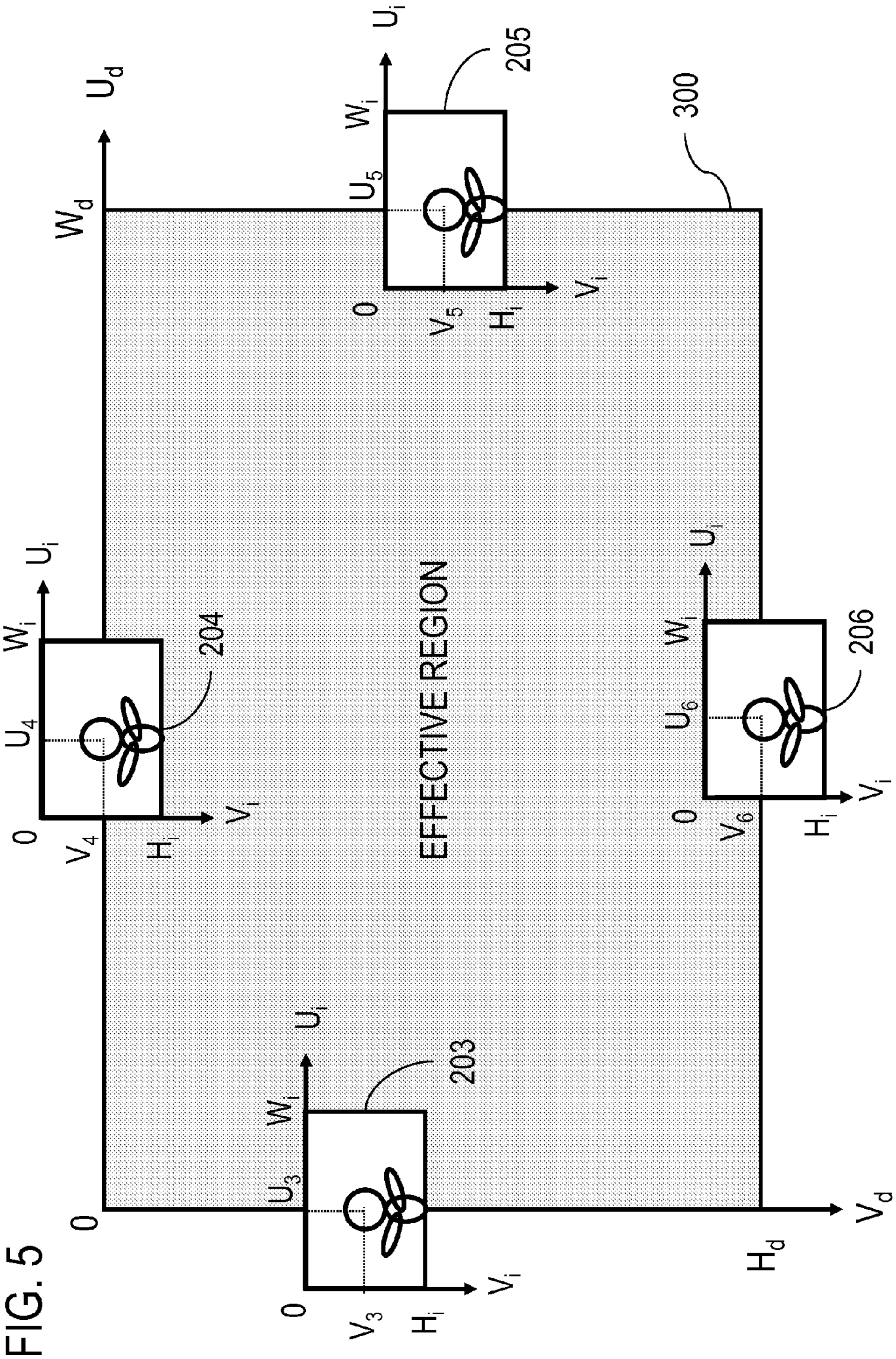
FIG. 5 is a diagram showing examples of object positions within display images, and display positions of the display images on a display screen.

Next, the display position determination section 106 acquires the region size ($W_d$, $H_d$) of the display screen, which has been acquired by the display screen region size acquisition section 105, and the positional information within the image, which has been stored by the in-image position storage section 1042. The display position determination section 106 then calculates an effective region size of the display screen (Sa2). FIG. 5 shows examples in which a $U_d$ and a $V_d$ coordinates corresponding to respective object positions are determined so that all of the object positions in the camera coordinate system can be displayed on the entire display screen 300, which has the region size of ($W_d$, $H_d$), in which each object image is displayed so that the determined coordinates represent the respective positions of the object 201 within each image. In FIG. 5, the object positions corresponding to input images 203, 204, 205, and 206 represent the minimal value of the X coordinate, the maximal value of the Z coordinate, the maximal value of the X coordinate, and the minimal value of the Z coordinate in the camera coordinate system, respectively. These input images are arranged at the left end, the upper end, the right end, and the lower end of the display screen 300, as shown in FIG. 5. When the display positions of the object are thus determined relative to the entire region on the display screen, the display images 203, 204, 205, and 206 are displayed in a state where a left half portion thereof, an upper half portion thereof, a right half portion thereof, and a lower half portion thereof, respectively, are cut off. In order to solve the problem that a portion of each display image is cut off, the effective region of the display screen is reduced based on the region size of the display screen and the positional information in the image.

Figure 6:
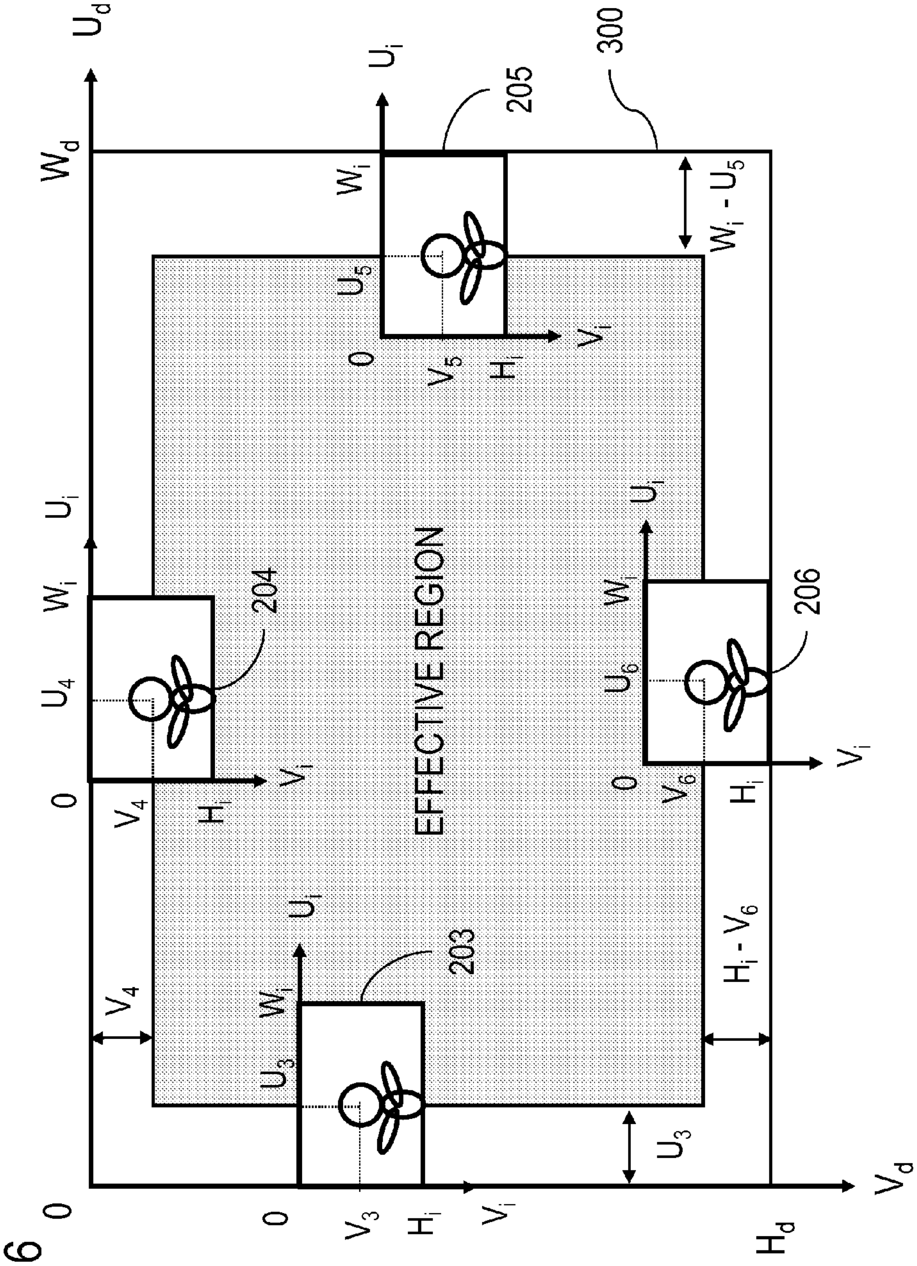
FIG. 6 is a diagram showing an example of the display images where the display positions thereof shown in FIG. 5 are corrected for display by the image display controlling apparatus according to the first embodiment of the present invention.

Specifically, in the case of the display image 203, the region size is reduced by $U_3$ in a positive direction of the $U_d$ axis so that a start position of the $U_d$ coordinate is shifted to $U_3$ as shown in FIG. 6, thereby preventing the left half portion of the display image from being cut off. In the case of the display image 204, the region size is reduced by $V_4$ in a positive direction of the $V_d$ axis so that the start position of the $V_d$ coordinate is shifted to $V_4$, thereby preventing the upper half portion of the display image from being cut off. In the case of the display image 205, the region size is reduced by ($W_i$−$U_5$) in a negative direction of the $U_d$ axis, thereby preventing the right half portion of the display image from being cut off. In the case of the display image 206, the region size is reduced by ($H_i$−$V_6$) in a negative direction of the $V_d$ axis, thereby preventing the lower half portion of the display image from being cut off.

The described above is generalized as follows. It is assumed, with respect to all input images $I_j$ where j=1 . . . N (N represents the number of frames per scene), that the X coordinate and the Z coordinate of the object position in the camera coordinate system are represented by ($X_j$, $Z_j$) where j=1 . . . N, and the positional information within each image is represented by ($U_j$, $V_j$) where j=1 . . . N. In order to calculate the effective region size, maximal values of the following are firstly calculated.

$$\{U_j-W_d\cdot(X_j-X_{min})/D_x\},\{W_i-U_j-W_d\cdot(X_{max}-X_j)/D_x\},$$

$$\{V_j-H_d\cdot(Z_{max}-Z_j)/D_z\},\{H_i-V_j-H_d\cdot(Z_j-Z_{min})/D_z\},$$

where j=1 . . . N.

Given that these maximal values are represented as follows, respectively:

$$\mathrm{MAX}\{U_j-W_d\cdot(X_j-X_{min})/D_x\};$$

$$\mathrm{MAX}\{W_i-U_j-W_d\cdot(X_{max}-X_j)/D_x\};$$

$$\mathrm{MAX}\{V_j-H_d\cdot(Z_{max}-Z_j)/D_z\};\text{ and}$$

$$\mathrm{MAX}\{H_i-V_j-H_d\cdot(Z_j-Z_{min})/D_z\},$$

the effective region size ($W_e$, $H_e$) is calculated as follows.

$$W_e=W_d-\mathrm{MAX}\{U_j-W_d\cdot(X_j-X_{min})/D_x\}-\mathrm{MAX}\{W_i-U_j-W_d\cdot(X_{max}-X_j)/D_x\} \quad \text{[Equation 1]}$$

$$H_e=H_d-\mathrm{MAX}\{V_j-H_d\cdot(Z_{max}-Z_j)/D_z\}-\mathrm{MAX}\{H_i-V_j-H_d\cdot(Z_j-Z_{min})/D_z\} \quad \text{[Equation 2]}$$

Alternatively, given that the maximal values of $U_j$, ($W_i$−$U_j$), $V_j$, and ($H_i$−$V_j$) where j=1 . . . N are represented by MAX{$U_j$}, MAX{$W_i$−$U_j$}, MAX{$V_j$}, and MAX {$H_i$−$V_j$}, respectively, the effective region size ($W_e$, $H_e$) is also calculated simply as follows:

$$W_e=W_d-\mathrm{MAX}\{U_j\}-\mathrm{MAX}\{W_i-U_j\} \quad \text{[Equation 3]}$$

$$H_e=H_d-\mathrm{MAX}\{V_j\}-\mathrm{MAX}\{H_i-V_j\} \quad \text{[Equation 4]}$$

Next, by using the following equations, the display position determination section 106 calculates a reduction rate $R_x$ in the X direction, and a reduction rate $R_z$ in the Z direction, based on $D_x$ and $D_z$ calculated by Step Sa1, and the effective region size ($W_e$, $H_e$) calculated by Step Sa2 (Sa3).

$$R_x=W_e/D_x \quad \text{[Equation 5]}$$

$$R_z=H_e/D_z \quad \text{[Equation 6]}$$

Next, by utilizing the reduction rates calculated by Step Sa3 and the object positional information 400, the display position determination section 106 determines a provisional display position 1 converted so as to fit the screen size (Sa4). The provisional display position 1 ($U_{j1}$, $V_{j1}$) where j=1 . . . N is determined as follows.

$$U_{j1}=(X_j-X_{min})\cdot R_x \quad \text{[Equation 7]}$$

$$V_{j1}=(Z_{max}-Z_j)\cdot R_z \quad \text{[Equation 8]}$$

Next, by using the following equations, the display position determination section 106 determines a provisional display position 2 ($U_{j2}$, $V_{j2}$) where j=1 . . . N by subtracting from the provisional display position 1 ($U_{j1}$, $V_{j1}$) calculated by Step Sa4 the respective values of the positional information within the image, so that the object face is arranged at a display position calculated based on the values of the X coordinate and the Z coordinate of the object position (Sa5).

$$U_{j2}=U_{j1}-U_j \quad \text{[Equation 9]}$$

$$V_{j2}=V_{j1}-V_j \quad \text{[Equation 10]}$$

Next, the display position determination section 106 calculates a display position ($U_{jf}$, $V_{jf}$) where j=1 . . . N by performing addition/subtraction of the same value to/from the $U_d$ coordinate and the $V_d$ coordinate of the provisional display position 2, so that the minimal values of each of the $U_d$ coordinate and the $V_d$ coordinate of the provisional display position 2 ($U_{j2}$, $V_{j2}$) become 0, and thereby the display position falls within the display screen region (Sa6). The display position ($U_{jf}$, $V_{jf}$) represents the origin position (a picture element at the upper left corner of each input image) of each of the input images 203 through 206 shown in FIG. 6 in terms of the $U_d$ coordinate and the $V_d$ coordinate.

Figure 7:
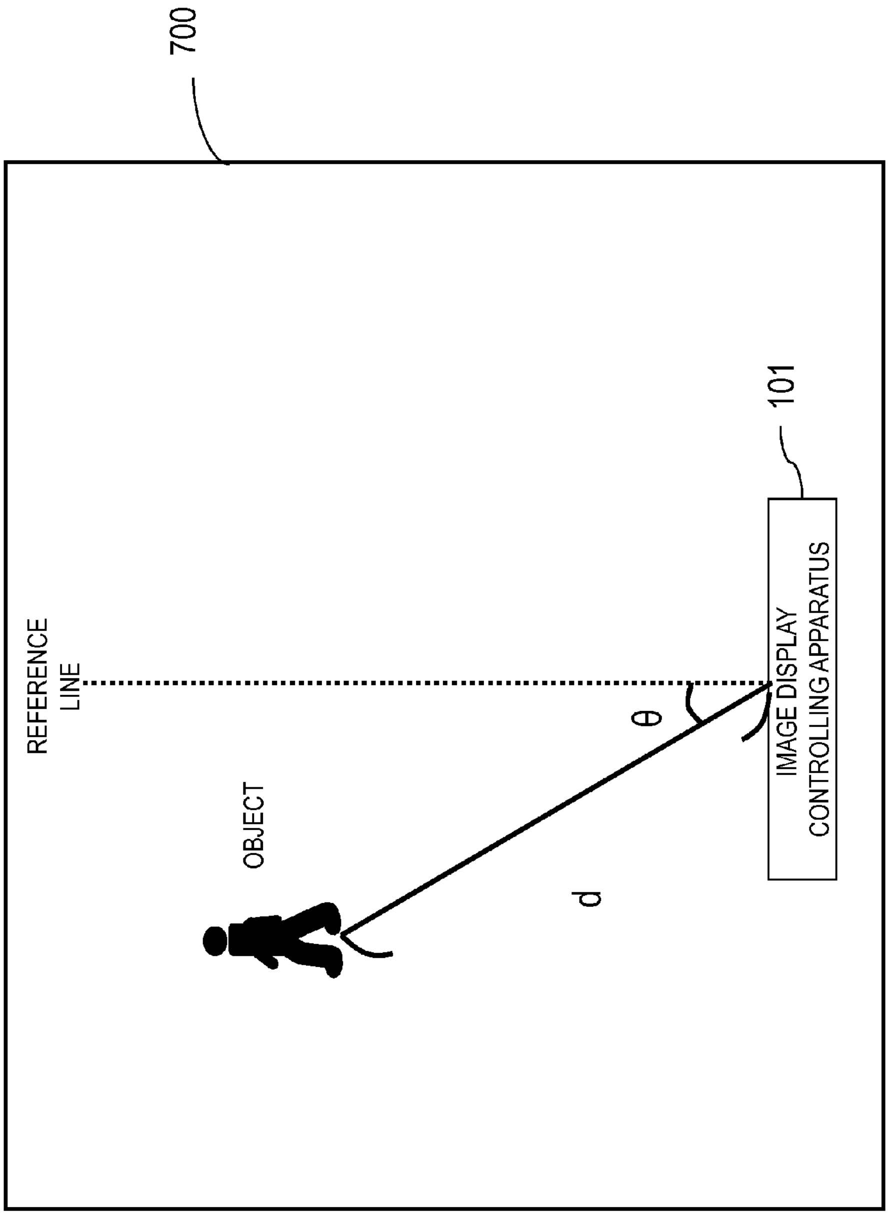
FIG. 7 is a diagram showing an example of information measured to detect an object position.

Next, an example according to the first embodiment of the present invention is described in detail. FIG. 7 is a diagram showing an exemplary configuration 700 indicating information measured to detect the object position by utilizing the distance sensor and the angle sensor. The measurement is performed on a distance between the image display controlling apparatus 100 and the object, which is represented by d, and on an angle at which the object position is present relative to the certain reference direction, which is represented by θ. The reference direction may be north direction, or may be the optical axis direction of the camera at the time when recording starts, or ends. FIG. 8 is a diagram showing measurement data 800 which shows the distance d between the image display controlling apparatus 101 and the object, and the angle θ, which are measured in the exemplary configuration 700.

FIG. 9 is a diagram showing object positional information 900 converted, by utilizing the measurement data 800, so as to fit the camera coordinate system. Since the distance and the angle between the image display controlling apparatus 100 and the object are represented by d and θ, respectively, the object positional information 400 is determined as (d sin θ, d cos θ). For example, in FIG. 8, in the case where time elapsed from reference time is 1 second, the distance d=8.3, and the angle θ=14 and thus, the corresponding positional information of the object is represented by (8.3 sin 14°, 8.3 cos 14°)=(2.01, 8.05).

FIG. 10 is a diagram showing an example of in-image positional information 500 obtained by analyzing the image data having VGA size of (640×480) by means of the face recognition process and determining the object position within the image. For example, that the time elapsed from the reference time is 1 second means that the object face is present at a position (280, 360) in the image data.

When the in-image position storage section 1042 stores therein the data shown in FIG. 10, and the object position storage section 1043 stores therein the data shown in FIG. 9, the display position determination section 106 performs the following operations. First, the minimal value and the maximal value of the X coordinate determined by Step Sa1 in FIG. 4 are 2.01 and 10.96, respectively, and thus, the maximal difference $D_x$ of the X coordinate results in 8.95. The minimal value and the maximal value of the Z coordinate determined are 5.97 and 10.96, respectively, and thus, the maximal difference $D_z$ of the Z coordinate results in 4.99.

Next, when the region size of the display screen is (7680, 4320), the effective region size ($W_e$, $H_e$) is calculated by Step Sa2 as follows, by using simple equations [Equation 3] and [Equation 4].

$$W_e=7680-300-(640-114)=6854$$

$$H_e=4320-372-(480-357)=3825$$

Next, the reduction rate $R_x$ in the X direction and the reduction rate $R_z$ in the Z direction are calculated by Step Sa3 as follows, by using [Equation 5] and [Equation 6].

$$R_x=6854\div 8.95=765.8$$

$$R_z=3825\div 4.99=766.5$$

Next, by utilizing the reduction rates calculated by Step Sa3 and the object positional information 900, the provisional display position 1 ($U_{j1}$, $V_{j1}$) converted so as to fit the display screen size is determined by Step Sa4. For example, in the case where time elapsed from the reference time is 1 second, the positional information of the object is represented by (2.01, 8.05) and thus, the provisional display position 1 ($U_{11}$, $V_{11}$) is calculated as follows, by using [Equation 7] and [Equation 8].

$$U_{11}=(2.01-2.01)\times 765.8=0.0$$

$$V_{11}=(10.96-8.05)\times 766.5=2230.5$$

Next, the provisional display position 2 ($U_{j2}$, $V_{j2}$) is calculated by Step Sa5 as follows. For example, in the case where time elapsed from the reference time is 1 second, the in-image positional information is represented by (280, 120) and thus, the provisional display position 2 ($U_{12}$, $V_{12}$) is determined as follows, by using [Equation 9] and [Equation 10].

$$U_{12}=0.0-280=-280.0$$

$$V_{12}=2230.5-360=1870.5$$

FIG. 11 is a diagram showing results obtained by calculating the provisional display positions 2 in the case where time elapsed from the reference time is 1 second to 10 seconds.

Next, the display position ($U_{jf}$, $V_{jf}$) is calculated by Step Sa6 as follows. For example, in the case where time elapsed from the reference time is 1 second, the minimum values of the $U_d$ coordinate and the $V_d$ coordinate of the provisional display position 2 are −280.0 and −372.0, respectively, and thus, the display position ($U_{1f}$, $V_{1f}$) is determined as follows.

$$U_{1f}=-280.0+280.0=0$$

$$V_{1f}=1870.5+372.0=2242.5$$

FIG. 12 is a diagram showing results obtained by calculating the display positions in the case where time elapsed from the reference time is 1 second to 10 seconds.

Although description of the first embodiment of the present invention is as described above, if the image display controlling apparatus 100 includes a means which directly detects the object position in the camera coordinate system, such means functions as the position generating section 103. Also, if the means, which directly detects the object position in the camera coordinate system, is provided external to the image display controlling apparatus 100, and connected to the image display controlling apparatus 100, a means, which receives the positional information from the position detecting means external to the image display controlling apparatus 100 to write the object position to the object position storage section 1043, functions as the position generating section 103.

If the movement of the object is so abrupt that the camera fails to capture the object during part of the capturing, that is, if the object is present outside the angle of view of the camera which captures the object, a suitable value may be assigned as the positional information in the image so that the positional relationship between the object and the angle of view of the camera can be understood. For example, if the object is present outside of and to the right side of the angle of view of the camera, ($W_i$, 0) is assigned to the positional information in the image, if the object is present outside of and to the left side of the angle of view of the camera, (−1.0) is assigned to the positional information in the image, if the object is present outside of and to the upper side of the angle of view of the camera, (0, −1) is assigned to the positional information in the image, and, if the object is present outside of and to the lower side of the angle of view of the camera, (0, $H_i$) is assigned to the positional information in the image, thereby reproducing the positional relationship between a position of the display image and a position at which the object is present. This can reduce situations where the display positions of the image change greatly in scenes while the object is coming from the outside of the image region into the image region. Therefore, smooth transition of the image position is achieved.

A position, outside of the angle of view of the camera, at which the object is present, can be detected by using a method that determines the optical axis direction of the camera, calculates the following angles: an angle θ formed between a straight line extending from the camera toward the object and a plane parallel to a vertical direction of the camera, which includes the optical axis; and an angle ϕ formed between the straight line extending from the camera toward the object and a plane parallel to the horizontal direction of the camera, which includes the optical axis, and determines based on the angles θ and ϕ a direction in which the object deviates from the angle of view of the camera. Alternatively, the position, outside of the angle of view of the camera, at which the object is present, may be detected based on which side in the image the object position is present in a frame immediately before the object disappears from the image. Namely, given that the object position in the frame immediately before its disappearance is $(U_k, V_k)$, the method determines which is the minimum value between values of $U_k$, $W_i-U_k$, $V_k$, and $H_i-V_k$, to detect that, if the $U_k$ has the minimal value, the object is present to the left side of the camera, if $W_i-U_k$ has the minimal value, the object is present to the right side of the camera, if $V_k$ has the minimal value, the object is present to the upper side of the camera, and, if $H_i-V_k$ has the minimal value, the object is present to the lower side of the camera.

Figure 13:
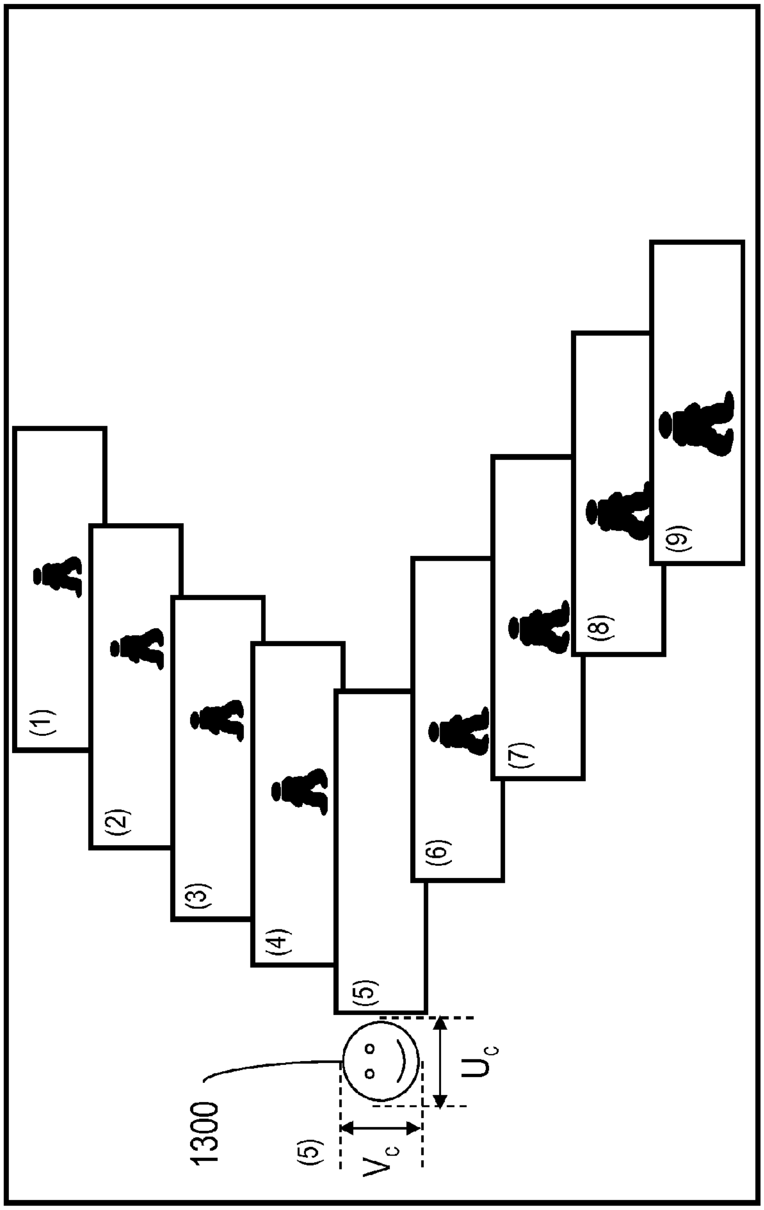
FIG. 13 is a diagram showing an example in which the object is displayed by means of an icon instead of an image, in the case where part of the object is not present in an input image.

When the object is present outside of the image region as described above, the image to be displayed does not contain the object and therefore, the movement of the object at the time of capturing cannot be reproduced. Because of this, an icon, a character, or a face image indicating the object may be displayed at a display position corresponding to the positional information of the object, and the captured image may be displayed in an angle of view of the camera in a direction viewed from the object. Such display example is shown in FIG. 13. In FIG. 13, an image (5) is displayed to the right side of an icon 1300 because the angle of view of the image (5) is located to the right side of the object due to the object abruptly moving in the left direction at a time when the image (5) is captured.

In this case, such a value as $(W_i, 0)$, or $(-1, 0)$ described above is not used in [Formula 9] and [Formula 10] as the positional information in the image. As shown in FIG. 13, given that the size of the image in which the icon or the like is displayed is represented by $U_c$ in the horizontal direction (on condition that $U_c<W$) and $V_c$ in the vertical direction (on condition that $V_c<H_i$), $(U_c/2, V_c/2)$ is used as the positional information in the image. In order to calculate the effective region size obtained by [Equation 1] through [Equation 4], the process steps are changed as follows, in accordance with the positional information within the image.

If the icon is displayed in the frame at the positional information in the image represented by $(W_i, 0)$, $\mathrm{MAX}\{U_j-W_d\cdot(X_j-X_{min})/D_x\}$ of [Formula 1], or $\mathrm{MAX}\{U_j\}$ of [Equation 3] is calculated by using $U_j+W_i$ instead of $U_j$.

If the icon is displayed in the frame at the positional information in the image represented by $(-1, 0)$, $\mathrm{MAX}\{W_i-U_j-W_d\cdot(X_{max}-X_j)/D_x\}$ of [Formula 1], or $\mathrm{MAX}\{W_i-U_j\}$ of [Equation 3] is calculated by using $W_i+U_c$ instead of $W_i$.

If the icon is displayed in the frame at the positional information in the image represented by $(0, -1)$, $\mathrm{MAX}\{H_i-V_j-H_d\cdot(Z_j-Z_{min})/D_z\}$ of [Formula 2], or $\mathrm{MAX}\{H_i-V_j\}$ of [Equation 4] is calculated by using $H_i+V_c$ instead of $H_i$.

If the icon is displayed in the frame at the positional information in the image represented by $(0, H_i)$, $\mathrm{MAX}\{V_j-H_d\cdot(Z_{max}-Z_j)/D_z\}$ of [Formula 2], or $\mathrm{MAX}\{V_j\}$ of [Formula 4] is calculated by using $V_j+H_i$ instead of $V_j$.

Additionally, if [Equation 1] through [Equation 8] are operated to determine the positional information in the image including the object position $(X_j, Z_j)$ at a time when the object is not captured, the icon or the like indicating the object is not cut off the display screen.

According to the present embodiment with the above configuration, the movement of the object in the depth direction perpendicular to the imaging plane of the camera can be reproduced, while the conventional image display controlling apparatus can merely reproduce the movement of the object, which is parallel to the imaging plane of the camera which captures the object. For example, when the object in front of the camera, running toward the camera, is displayed, the above configuration allows the object to be displayed, moving from the upper portion of the display screen region toward the lower portion thereof, while the conventional image display controlling apparatus displays the object approximately at a fixed position.

Figure 14:
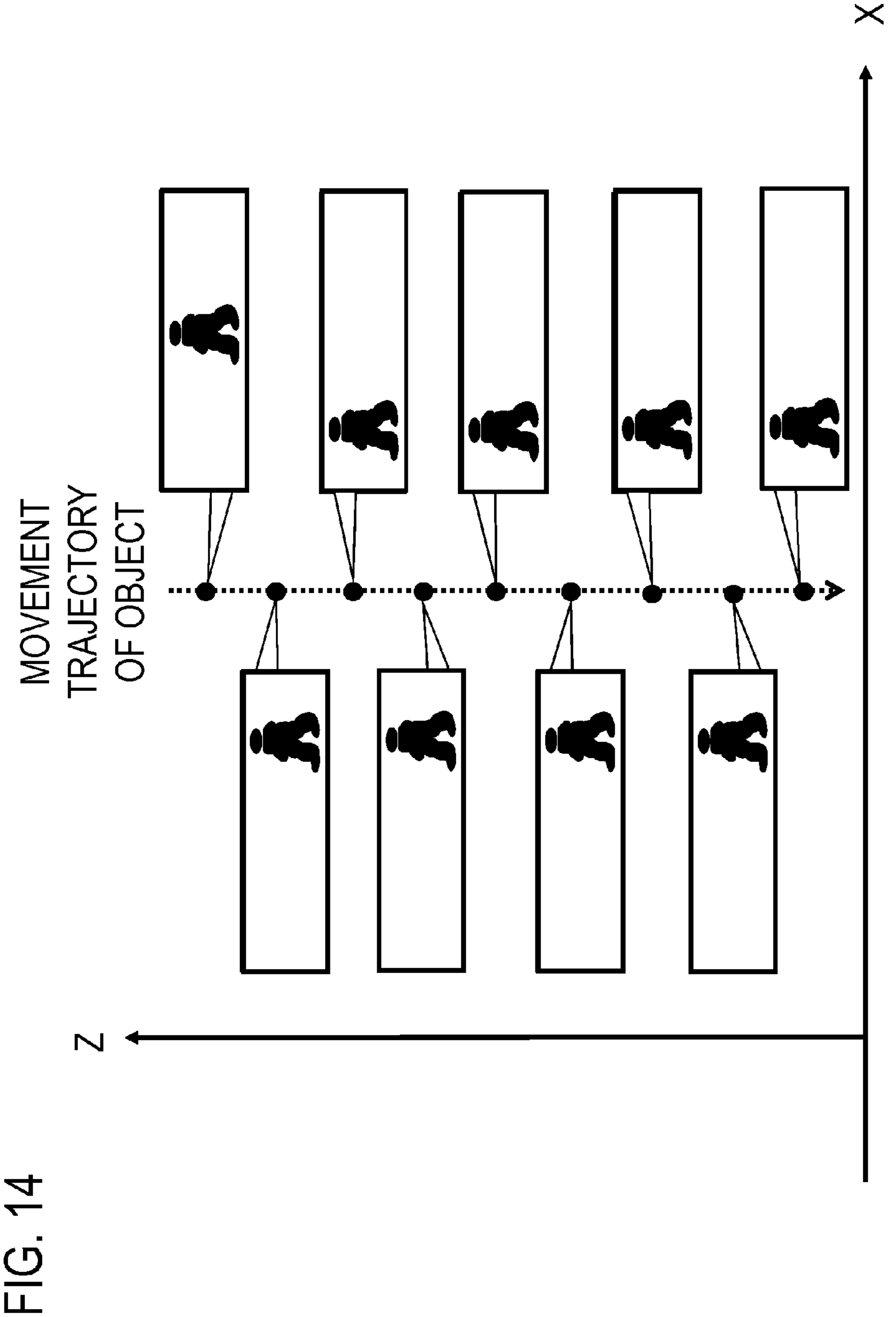
Figure 15:
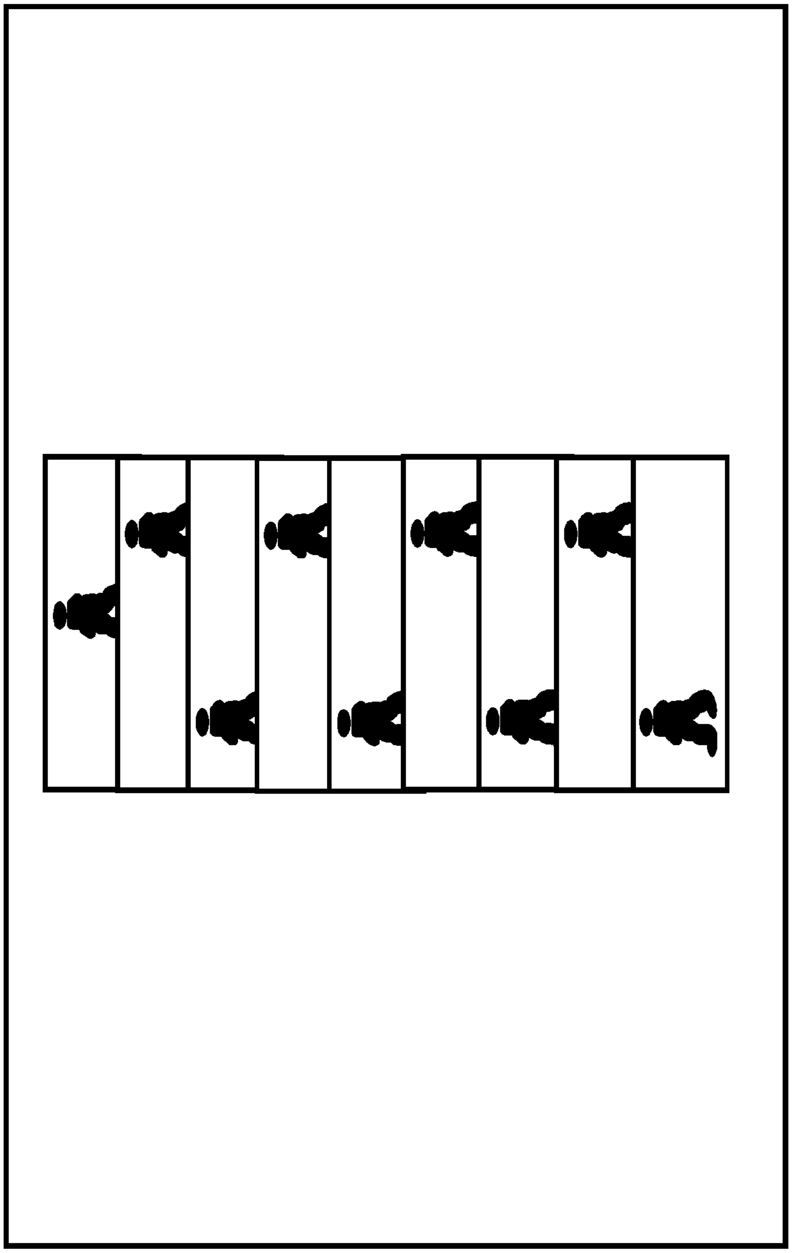
FIG. 15 is a diagram showing an example in which the input images shown in FIG. 14 are displayed in association with the object positions in space, without regard to the object positions in the image.
Figure 16:
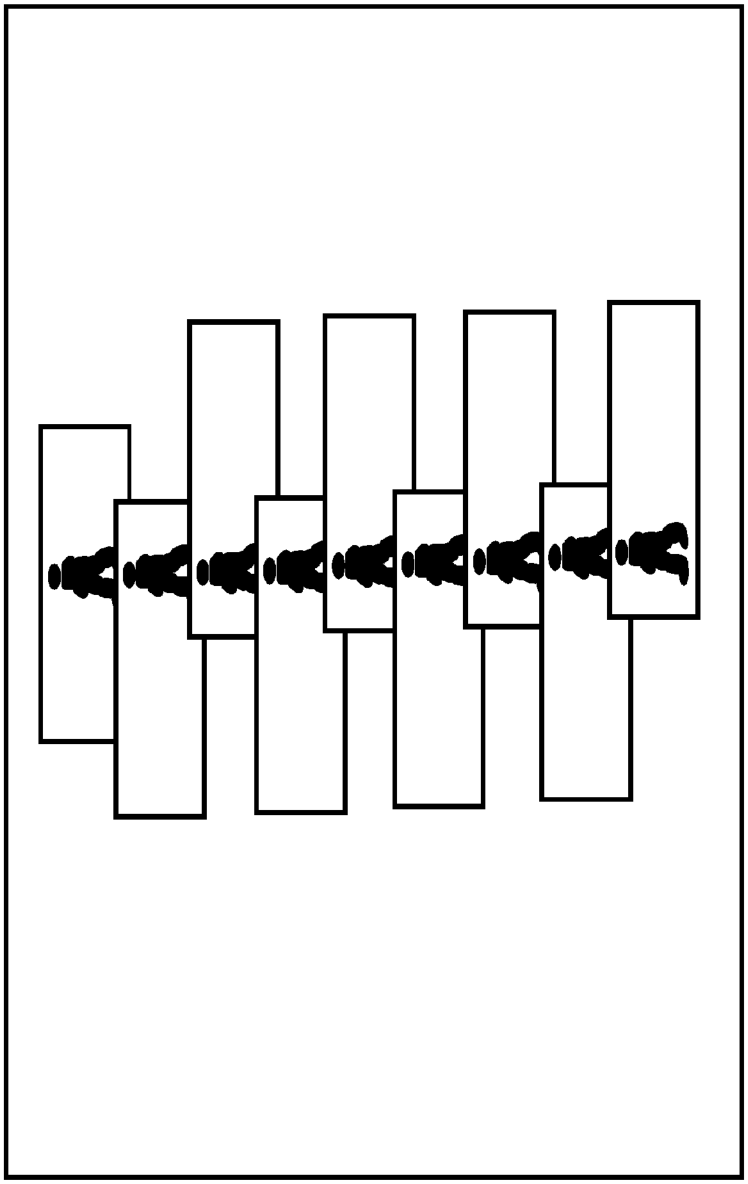
FIG. 16 is a diagram showing an example in which the images are displayed with regard to the object positions in the image.

Further, according to the present embodiment, the display position of the object is determined with regard to the object position in the image region and therefore, the object can be displayed with the movement of the object being faithfully reproduced. For example, as shown in FIG. 14, if the camera captures the object in front of the camera, running toward the camera, at random display positions due to camera shake or the like, and if the object position in the image region is not regarded, the object is displayed in a zigzag manner as shown in FIG. 15. Therefore, it is hard for the user to see the image. On the other hand, according to the present embodiment, the object positions are smoothly displayed corresponding to actual movements of the object as shown in FIG. 16. Therefore, it is easy for the user to see the image.

Second Embodiment

The display process of the first embodiment assumes that the camera, which captures the object, does not zoom. If a video, which is obtained by the camera performing zoom while capturing the object, is displayed according to the conventional technologies or the method used in the first embodiment, the object abruptly becomes large or small during the display. Therefore, the user can be made to feel uncomfortable while seeing the video. Because of this, in a second embodiment, the size of the object is fixed, or scaled up or down to the extent which does not make the user feel uncomfortable and thus, the object is displayed.

Figure 17:
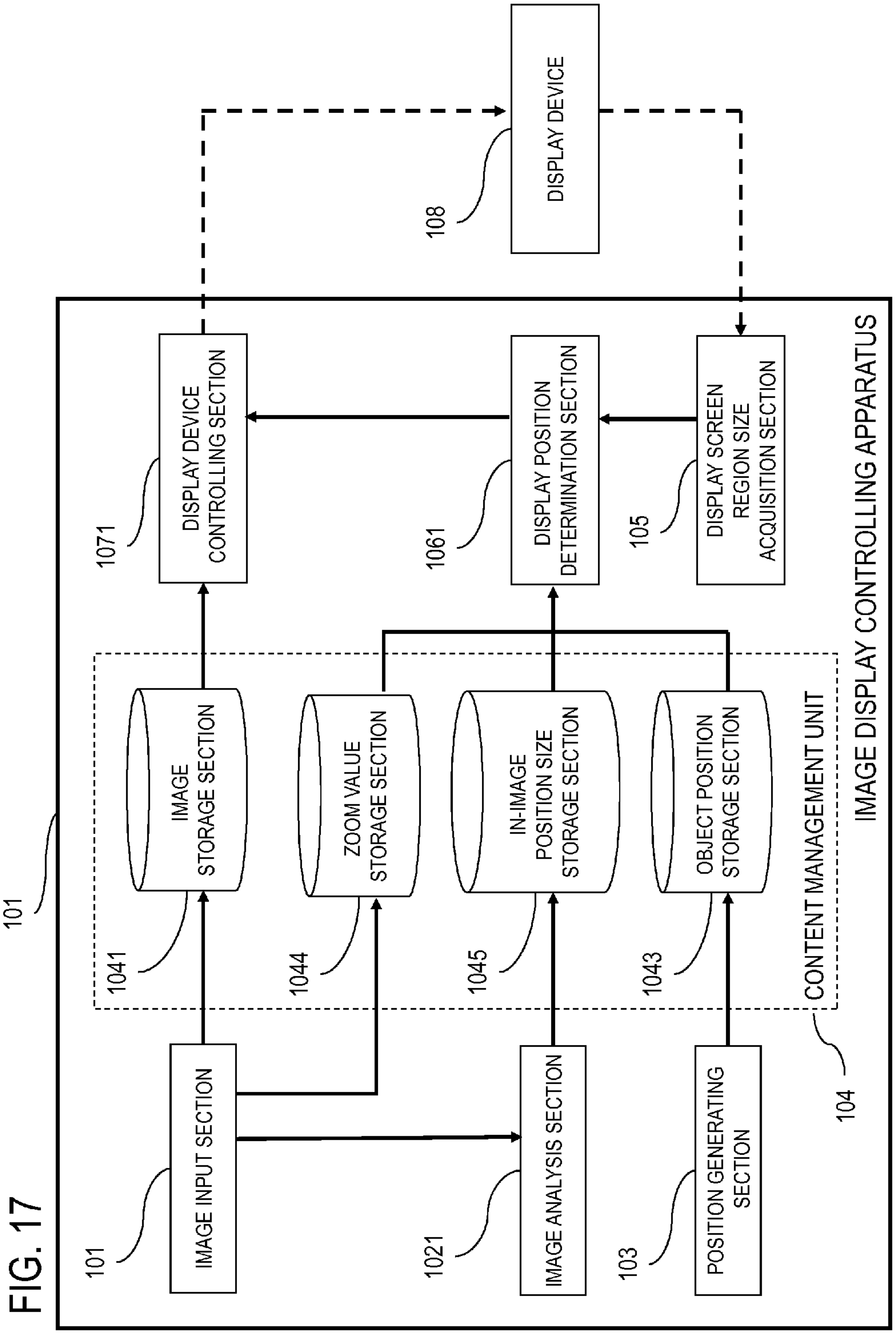
FIG. 17 is a diagram showing a configuration of an image display controlling apparatus according to a second embodiment of the present invention.

FIG. 17 is a block diagram illustrating a configuration of an image display controlling apparatus according to the second embodiment of the present invention. In FIG. 17, the content management unit 104 further includes a zoom value storage section 1044, and includes an in-image position size storage section 1045 instead of the in-image position storage section 1042. Also, different reference characters are given to an image analysis section 1021, a display position determination section 1061, and a display device controlling section 1041 because part of the operation thereof is different from that of the first embodiment. The rest of the components have the same configuration, and thus the description thereof is omitted.

The image analysis section 1021 analyzes image data obtained by the image input section 101 to detect an object within an image region. A timing when the image analysis section 1021 analyzes the image data, and a method used for detecting the object may be the same as those of the first embodiment. The image analysis section 1021 detects the size of the object, in addition to coordinates of the barycenter of a region in which the object face is displayed or coordinates of the barycenter of a region in which an object is displayed, as an object position. The size of the object is either the height (vertical length) or the width (horizontal length) of the object face, or the height (vertical length) or the width (horizontal length) of the object.

The zoom value storage section 1044 stores therein a zoom value corresponding to each image stored by the image storage section 1041. The in-image position size storage section 1045 stores therein the positional information of the object within the image region and the size of the object, which are detected by the image analysis section 1021, in association with the image data on the frame-by-frame basis.

The display position determination section 1061 determines a display position of the object on the display device and a corrected zoom value, which is obtained by correcting the zoom value of each image stored by the zoom value storage section 1044, by utilizing the zoom value of each image stored by the zoom value storage section 1044, the positional information of the object within the image region, and the size of the object, which are stored by the in-image position size storage section 1045, the positional information of the object in the camera coordinate system stored by the object position storage section 1043, and the screen size information of the display device acquired by the display screen region size acquisition section 105. Process steps performed by the display position determination section 106 is described later in detail.

The display device controlling section 1071 scales up or down the image data stored by the image storage section 1041, according to the corrected zoom value, and transmits a signal to the display device 108 so as to display the scaled up or down image data at the display position determined by the display position determination section 106.

Figure 18:
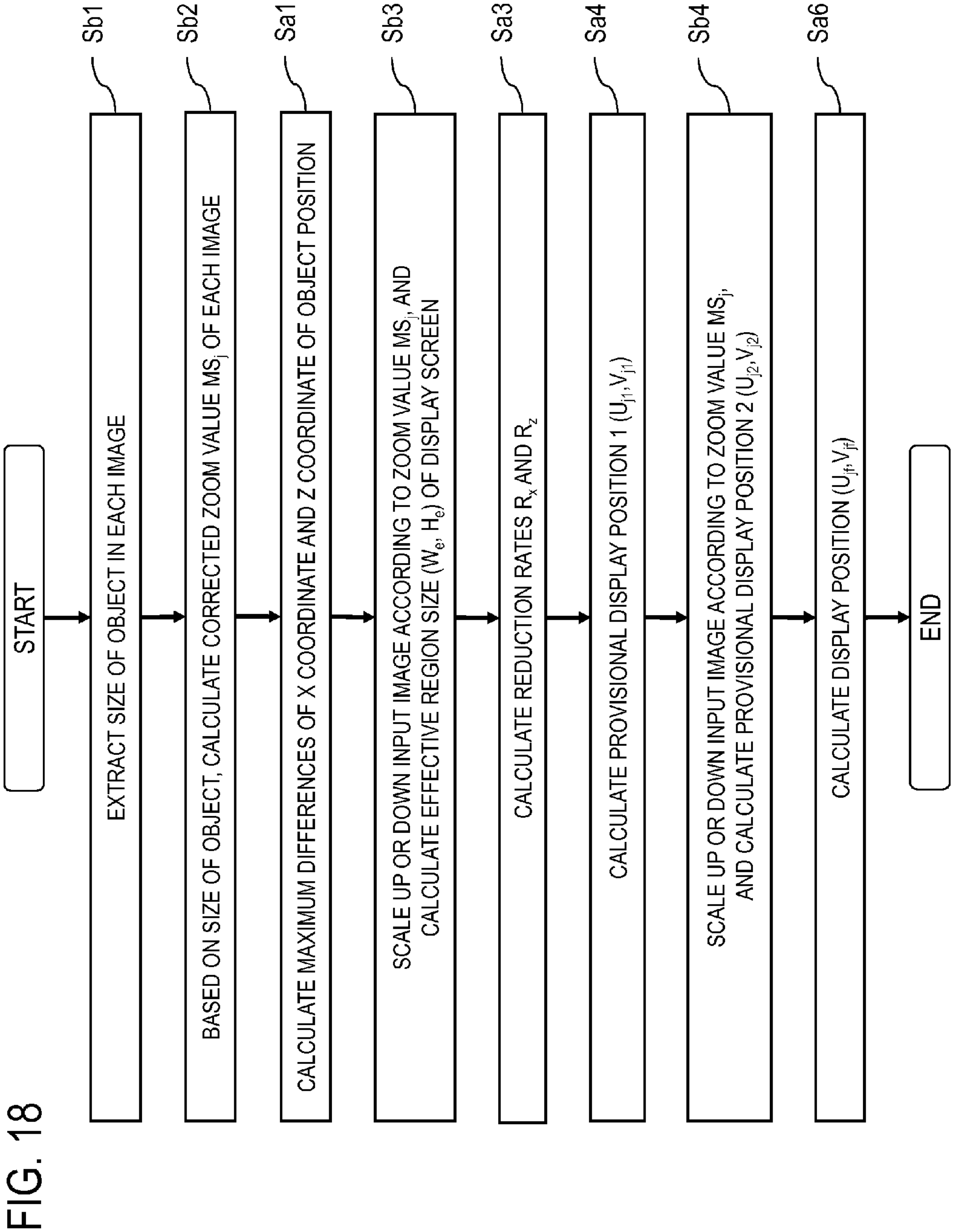
FIG. 18 is a flowchart showing process steps performed by the display position determination section 1061 of the second embodiment.

Next, a process flow of the display position determination section 1061 of the present invention is described in detail. FIG. 18 shows a flowchart of the process steps performed by the display position determination section 1061.

First, the display position determination section 1061 extracts the size of the object, which is stored by the in-image position size storage section 1045 (Sb1). Next, based on the size of the object, the display position determination section 1061 calculates the corrected zoom value of each image (Sb2). Given that $L_j$ where j=1 . . . N represents the size of the object displayed in each input image represented by $I_j$ where j=1 . . . N (N represents the number of frames in the scene), the corrected zoom value $MS_j$ where j=1 . . . N is calculated as follows.

$$MS_j=L_j/L_b \quad \text{[Equation 11]}$$

$L_b$ represents a reference value of the object size. Thus, a predetermined value may be stored in the image display controlling apparatus, or an average value of $L_j$ may be calculated per scene, and the obtained average value may be used as $L_b$.

Next, in the same manner as the first embodiment, the display position determination section 1061 calculates a maximal difference $D_x$ of the X coordinate and a maximal difference $D_z$ of the Z coordinate of the object position stored by the object position storage section 1043 (Sa1). A maximal value and a minimal value of the X coordinate, which are determined by the calculation of the maximal difference $D_x$, are represented by $X_{max}$, $X_{min}$, respectively. A maximal value and a minimal value of the Z coordinate, which are determined by the calculation of the maximal difference $D_z$, are represented by $Z_{max}$ and $Z_{min}$, respectively.

The display position determination section 1061 utilizes the corrected zoom value, in addition to the values utilized by the first embodiment, to calculate an effective region size ($W_e$, $H_e$). With respect to all input images $I_j$ where j=1 . . . N, the X coordinate and the Z coordinate of the object position in the camera coordinate system are represented by ($X_j$, $Z_j$) where j=1 . . . N, the positional information in the image is represented by ($U_j$, $V_j$) where j=1 . . . N, and the corrected zoom value is represented by $MS_j$ where j=1 . . . N. In order to calculate the effective region size, maximal values of the following are firstly calculated.

$$\{U_j/MS_j-W_d\cdot(X_j-X_{min})/D_x\},$$

$$\{(W_i-U_j)/MS_j-W_d\cdot(X_{max}-X_j)/D_x\},$$

$$\{V_j/MS_j-H_d\cdot(Z_{max}-Z_j)/D_z\},$$

$$\{(H_i-V_j)/MS_j-H_d\cdot(Z_j-Z_{min})/D_z\},$$

where j=1 . . . N.

Given that these maximal values are represented as follows, respectively:

$$\mathrm{MAX}\{U_j/MS_j-W_d\cdot(X_j-X_{min})/D_x\};$$

$$\mathrm{MAX}\{(W_i-U_j)/MS_j-W_d\cdot(X_{max}-X_j)/D_x\};$$

$$\mathrm{MAX}\{V_j/MS_j-H_d\cdot(Z_{max}-Z_j)/D_z\};\ \text{and}$$

$$\mathrm{MAX}\{(H_i-V_j)/MS_j-H_d\cdot(Z_j-Z_{min})/D_z\},$$

the effective region size ($W_e$, $H_e$) is calculated as follows.

$$W_e=W_d\cdot\mathrm{MAX}\{U_j/MS_j-W_d\cdot(X_j-X_{min})/D_x\}-\mathrm{MAX}\{(W_i-U_j)/MS_j-W_d\cdot(X_{max}-X_j)/D_x\} \quad \text{[Equation 12]}$$

$$H_e=H_d-\mathrm{MAX}\{V_j/MS_j-H_d\cdot(Z_{max}-Z_j)/D_z\}-\mathrm{MAX}\{H_i-V_j)/MS_j-H_d\cdot(Z_j-Z_{min})/D_Z\} \quad \text{[Equation 13]}$$

Alternatively, given that the maximal values of $U_j/MS_j$, $(W_i-U_j)/MS_j$, $V_j/MS_j$, and $(H_i-V_j)/MS_j$ where j=1 . . . N are represented by $\mathrm{MAX}\{U_j/MS_j\}$, $\mathrm{MAX}\{(W_j-U_j)/MS_j\}$, $\mathrm{MAX}\{V_j/MS_j\}$, and $\mathrm{MAX}\ \{(H_i-V_j)/MS_j\}$, respectively, the effective region size ($W_e$, $H_e$) is also calculated simply as follows (Sb3).

$$W_e=W_d-\mathrm{MAX}\{U_j/MS_j\}-\mathrm{MAX}\{(W_i-U_j)/MS_j\} \quad \text{[Equation 14]}$$

$$H_e=H_d-\mathrm{MAX}\{V_j/MS_j\}-\mathrm{MAX}\{(H_i-V_j)/MS_j\} \quad \text{[Equation 15]}$$

Next, in the same manner as the first embodiment, the display position determination section 1061 determines a reduction rate $R_x$ in the X direction, a reduction rate $R_z$ in the Z direction, and a provisional display position 1 ($U_{j1}$, $V_{j1}$) where j=1 . . . N (Sa3, Sa4).

Next, the display position determination section 1061 subtracts from the provisional display position 1 ($U_{j1}$, $V_{j1}$) calculated by Step Sa4 the values of the positional information in the image to calculate a provisional display position 2 ($U_{j2}$, $V_{j2}$) where j=1 . . . N as follows, so that the object face is arranged at a display position calculated based on the values of the X coordinate and the Z coordinate of the object position (Sb4).

$$U_{j2}=U_{j1}-U_j/MS_j \quad \text{[Equation 16]}$$

$$V_{j2}=V_{j1}-V_j/MS_j \quad \text{[Equation 17]}$$

Lastly, the display position determination section 1061 calculates the display position ($U_{jf}$, $V_{jf}$) where j=1 . . . N, in the same manner as the first embodiment (Sa6).

Figure 19:
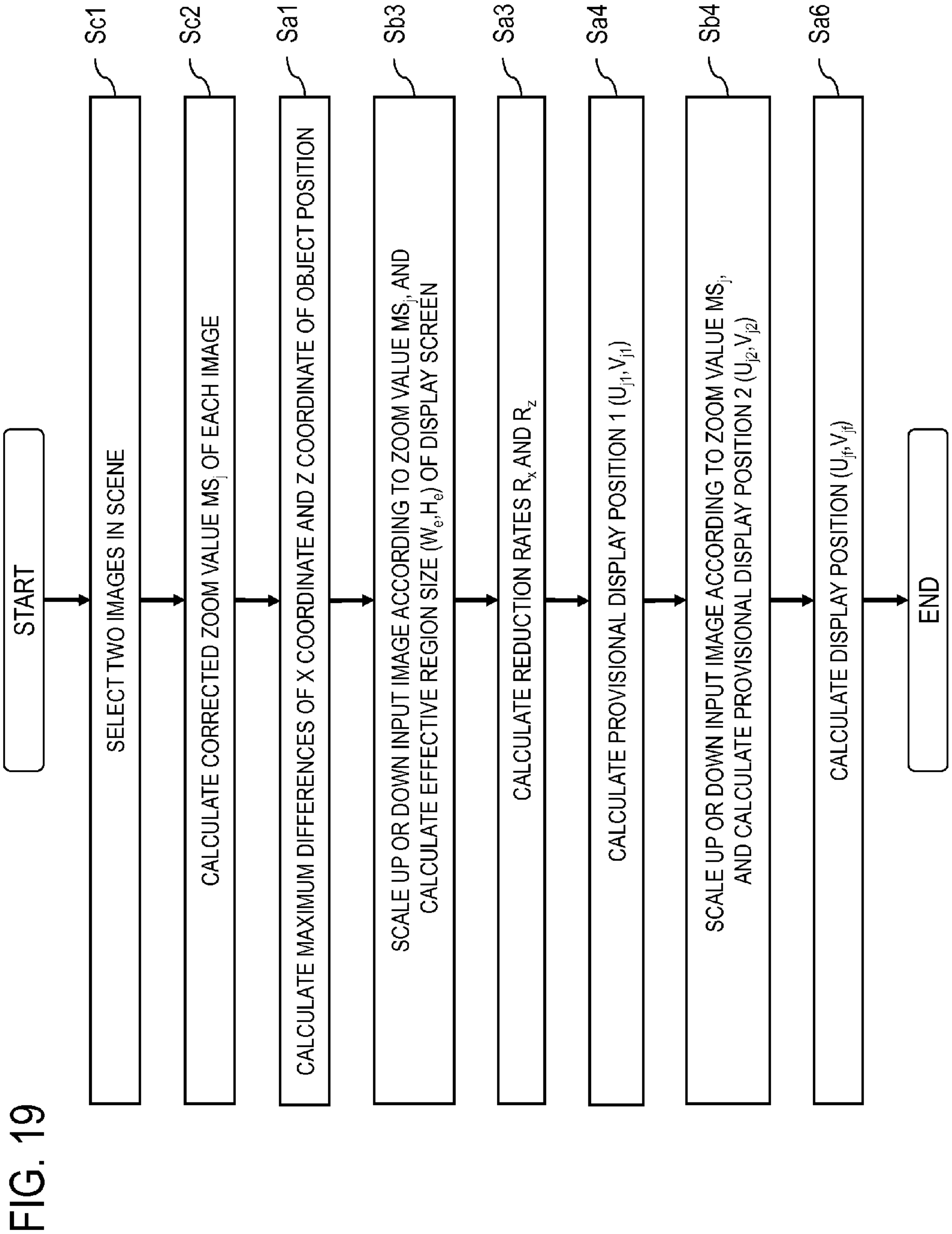
FIG. 19 is a flowchart showing another process steps performed by the display position determination section 1061 of the second embodiment.

Additionally, the display position determination section 1061 of the present invention is able to scale up or down the input image to the extent which does not make the user feel uncomfortable. FIG. 19 shows a flowchart of process steps performed by the display position determination section 1061 in this case. The process steps shown in FIG. 19 are different from those shown in FIG. 18 in that the process steps shown in FIG. 19 performs Steps Sc1 and Sc2, instead of Steps Sb1 and Sb2 shown in FIG. 18. Thus, hereinafter, merely the different process steps is described in detail.

First, the display position determination section 1061 selects from frames included in a scene two frames, which are used as references for calculating a corrected zoom value (Sc1). Among the input images represented by $I_j$ where j=1 . . . N (N represents the number of frames in the scene), the selected two frames are represented by $I_{b1}$, and $I_{b2}$ (on condition that b1<b2), respectively. Given that the Z coordinate of an object position corresponding to the input images $I_j$ is represented by $Z_j$ where j=1 . . . N, it is preferable that a value of j when $Z_j$ becomes minimum and a value of j when $Z_j$ becomes maximum are assigned to b1 or b2, respectively, because the error is reduced.

Next, the corrected zoom value for each image is calculated (Sc2). Here, it is given that the size of the object present in each input image $I_j$ where j=1 . . . N is represented by $L_j$ where j=1 . . . N, a zoom value of the camera, which captures the object, is represented by $S_j$ where j=1 . . . N, the Z coordinate of the object position in the camera coordinate system is represented by $Z_j$ where j=1 . . . N, and a corrected zoom value is represented by $MS_j$ where j=1 . . . N. Each object size, which is not zoomed, is determined by dividing the object size by the corresponding zoom value. Therefore, the sizes of the objects, which are not zoomed, in the input images $I_{b1}$, $I_{b2}$, and $I_j$ are represented by $L_{b1}/S_{b1}$, $L_{b2}/S_{b2}$, and $L_j/MS_j$, respectively. Further, in order to scale up or down the object to the extent which does not make the user feel uncomfortable, it is assumed that the size of the object face, which is not zoomed, becomes smaller in proportion to the distance between the camera and the object. In this case, the following two ratios become equal to each other: a ratio between an increased amount $(L_{b2}/S_{b2}-L_{b1}/S_{b1})$ in size of the face, which is not zoomed, from the input image $I_{b1}$ to the input image $I_{b2}$, and an increased amount $(L_j/MS_j-L_{b1}/S_{b1})$ in size of the face, which is not zoomed, from the input image $I_{b1}$ to the input image $I_j$; and a ratio between an increased amount $(Z_{b2}-Z_{b1})$ of the Z coordinate from the input image $I_{b1}$ to the input image $I_{b2}$ and an increased amount $(Z_j-Z_{b1})$ of the Z coordinate from the input image $I_{b1}$ to the input image $I_j$. Therefore, the following relational expression is satisfied.

$$(L_{b2}/S_{b2}-L_{b1}/S_{b1}):(L_j/MS_j-L_{b1}/S_{b1})=(Z_{b2}-Z_{b1}):(Z_j-Z_{b1}) \quad \text{[Equation 18]}$$

According to Equation 18, the corrected zoom value $MS_j$ where j=1 . . . N is determined as follows.

$$MS_j=S_{b1}S_{b2}(Z_{b2}-Z_{b1})L_j/\{S_{b1}(Z_j-Z_{b1})L_{b2}+S_{b2}(Z_{b2}-Z_j)L_{b1}\} \quad \text{[Equation 19]}$$

The corrected zoom value $MS_j$ where j=1 . . . N is calculated as described above, and the display position $(U_{jf}, V_{jf})$ where j=1 . . . N is then calculated by the method described above.

Figure 20:
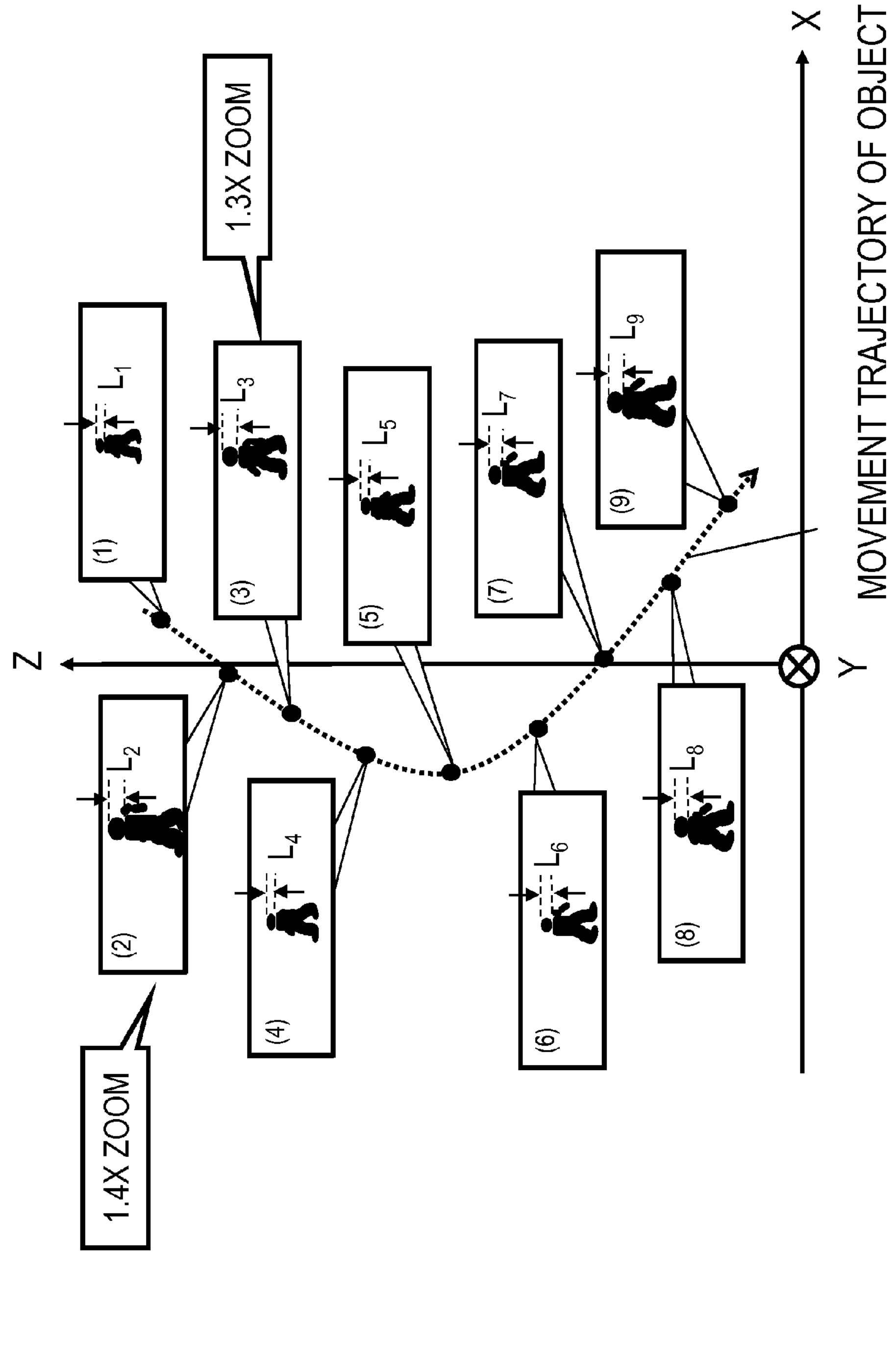
FIG. 20 is a diagram showing example of the movement trajectory and the input images of the object when the object is captured being zoomed in part of a scene.

Next, an embodiment according to the second embodiment of the present invention is described in detail. FIG. 20 is a diagram showing an example of a coordinate system of the camera which captures an image to be displayed by an image display controlling apparatus, and the movements of an object in the coordinate system. X, Y, and Z axes in FIG. 20 indicate X, Y, and Z axes in the camera coordinate system, respectively. Also, as indicated by a dotted line, it is assumed that the object moves approaching toward the camera. It is also assumed that images indicated by rectangular balloons are captured at time points each shown as a black circle on a dotted line. Numbers are attached at the upper left corners of the images to identify each image. In later-described FIG. 21 and FIG. 22, images having the same numbers as the images shown in FIG. 20 correspond to each other.

In the example shown in FIG. 20, the object size is the height (vertical length) of the face, and represented by $L_j$ where j=1 . . . 9 in each image. Since an image (2) is zoomed by 1.4 times when captured and an image (3) is zoomed by 1.3 times when captured, these images are displayed having larger sizes as compared to the other images.

Figure 21:
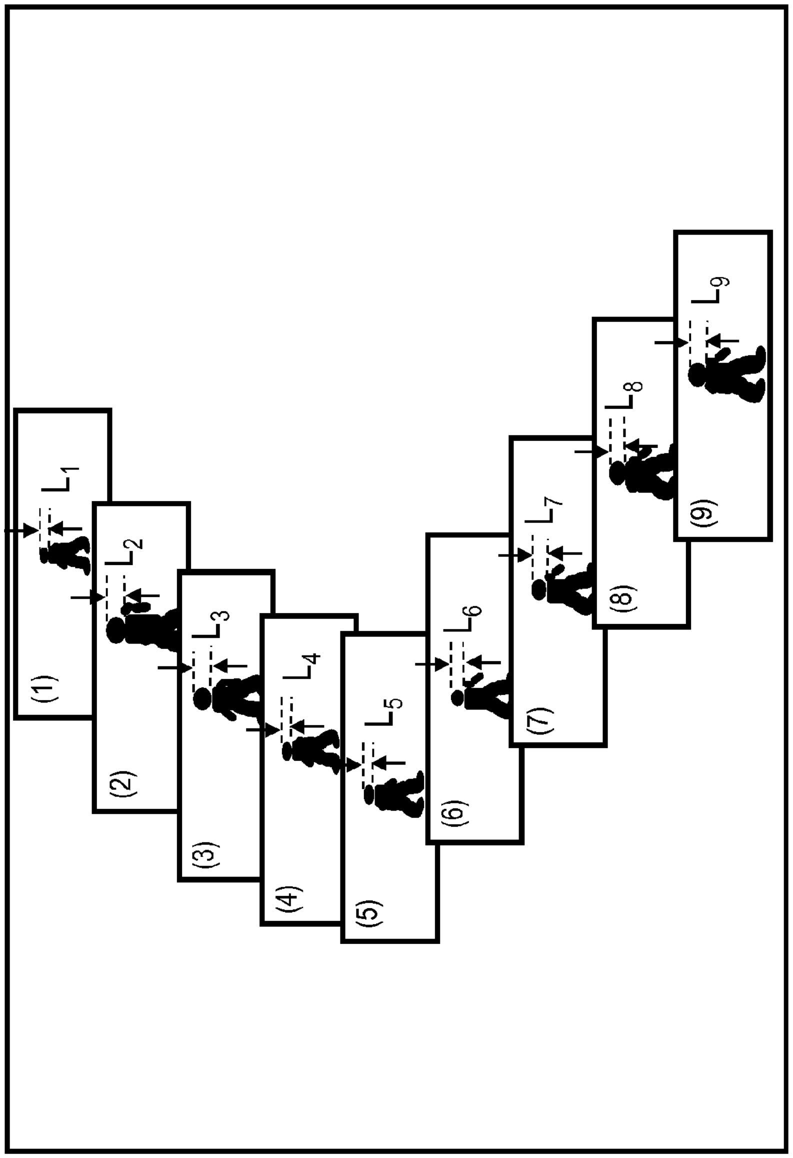
FIG. 21 is a diagram showing an example in which the input images shown in FIG. 20 are displayed by the image display controlling apparatus according to the first embodiment of the present invention.

FIG. 21 is a diagram showing the images, which are thus acquired and, which are displayed by the method used by the first embodiment. In FIG. 21, when the object moves, the object in the images (2) and (3) abruptly becomes large, and the object in an image (4) abruptly becomes small. Therefore, the user can be made to feel uncomfortable while seeing these images.

Figure 22:
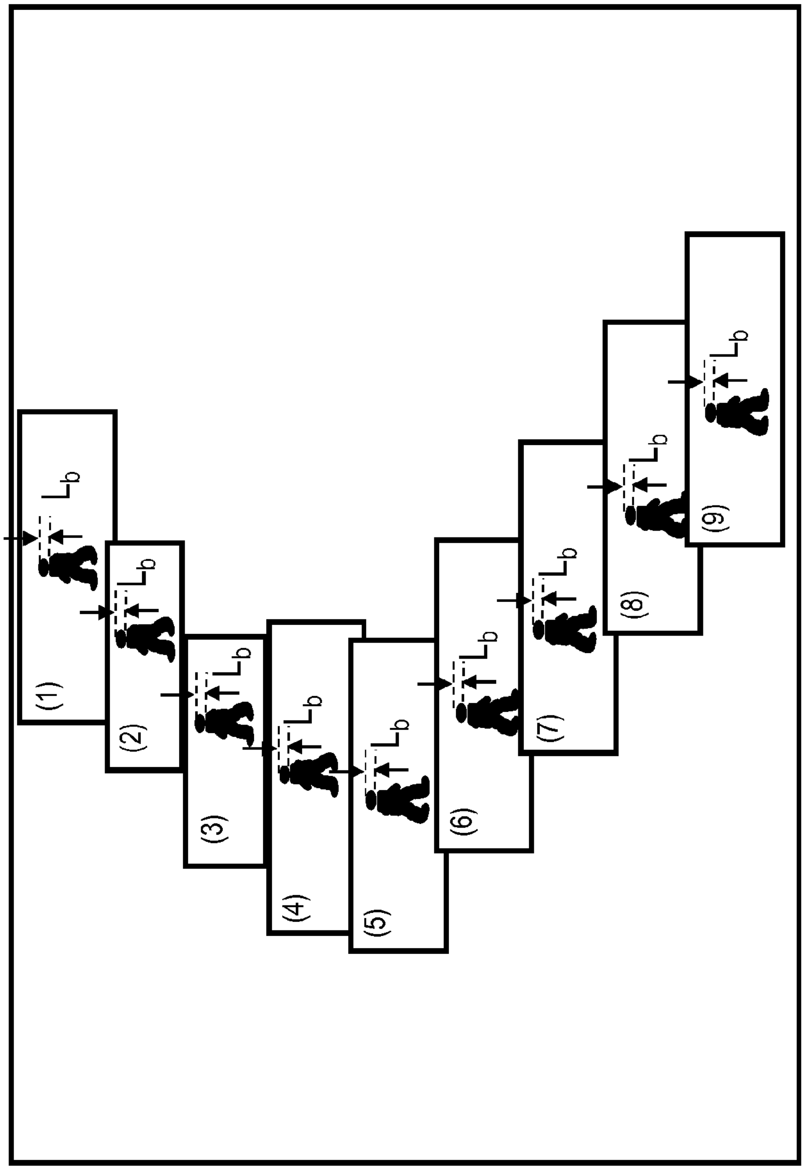
FIG. 22 is a diagram showing an example in which the input images shown in FIG. 20 are displayed by the image display controlling apparatus according to the second embodiment of the present invention.

FIG. 22 is a diagram showing the images obtained for display by scaling up or down the images acquired as shown in FIG. 20 through the process steps shown in FIG. 18 performed by the display position determination section 1061. In the example shown in FIG. 22, each image is scaled up or down so that all of the object sizes are fixed to $L_b$. Therefore, the object size in each image is substantially the same as each other. As a result, it is conceived that the user seeing these images feels less uncomfortable as compared to seeing the example shown in FIG. 21.

According to the second embodiment, with the configuration described above, even if the object is zoomed during capturing, the object size is fixed, or scaled up or down for display to the extent which does not make the user feel uncomfortable. Therefore, the user can see the image without feeling uncomfortable.

Although the embodiments of the present invention have been described as the image display controlling apparatus, the present invention may be realized by a image display method, or a recording medium having therein an image displaying program recorded. Further, the functional blocks described as the image input section 101, the image analysis section 102, the position generating section 103, the display screen region size acquisition section 105, the display position determination section 106, and the display device controlling section 107, which are shown in FIG. 1, are each typically realized as an LSI, which is an integrated circuit. These functional blocks may be formed into one chip, or a part or the whole of the functional blocks may be included in one chip. Although the LSI is mentioned herein, it may also be called an IC (Integrated Circuit), a system LSI, a super LSI, an ultra LSI, or an ultra LSI, depending on the difference in the degree of integration.

Furthermore, the method for circuit integration is not limited to the LSI, and may be realized through circuit-integration of a dedicated circuit or a general-purpose processor. An FPGA (Field Programmable Gate Array), which is capable of programming after manufacturing the LSI, or a reconfigurable processor, which is capable of reconstituting connections and configurations of a circuit cell within the LSI, may be used. Further, if a circuit integration technology replacing the LSI technology is developed with an advance of semiconductor technology and other technologies deviated therefrom, it is needless to say that integration of the functional blocks may be performed by using the technology. Application of biotechnology or the like may be possible.

INDUSTRIAL APPLICABILITY

The present invention is applicable to information equipment which handles digital data, such as TVs, various recorders which generate signals for outputting images on TV, personal computers, mobile phones, and PDAs. Particularly, the present invention is useful to move a captured video for display on a screen of such equipment.

DESCRIPTION OF THE REFERENCE CHARACTERS

100 image display controlling apparatus
101 image input section
102 image analysis section
103 position generating section
104 content management unit
1041 image storage section
1042 in-image position storage section
1043 object position storage section
1044 zoom value storage section
1045 in-image position size storage section
105 display screen region size acquisition section
106, 1061 display position determination section
107, 1071 display device controlling section
108 display device
200, 203, 204, 205, 206 input image
201 object in input image
300 display screen
700 exemplary configuration at detection of object position
800 measurement data used to calculate object positions
900 object positional information
1000 in-image positional information
1100 calculation results of provisional display positions 2
1200 calculation results of display positions
1300 icon

The invention claimed is:

1. An image display controlling apparatus for displaying, on a display device, image data of a video in which an object is captured, the image display controlling apparatus comprising:

a position generating section for generating positional information of the object which is described in an orthogonal coordinate system in which a camera, which captures the object, is used as reference;

a content management unit for storing therein, on a frame-by-frame basis of the video, the positional information of the object generated by the position generating section;

a display position determination section for determining a display position of each frame of the video by associating a coordinate of the object in a depth direction in the coordinate system with a coordinate of a vertical axis of the display device, and associating a coordinate of the object in a horizontal direction in the coordinate system with a coordinate of a horizontal axis of the display device; and a display device controlling section for transmitting a signal to the display device to display the video at the display position determined by the display position determination section.

2. The image display controlling apparatus according to claim 1 further comprising:

a display screen region size acquisition section for acquiring the size of a displayable region of the display device; and an image analysis section for identifying an object position in each frame of the video, wherein the content management unit stores therein the positional information of the object and in-image positional information of the object in each frame of the video analyzed by the image analysis section by associating with one another on the frame-by-frame basis of the video, the display position determination section determines a correspondence between the positional information and the display position so that the display position falls within the displayable region, by using the size of the displayable region acquired by the display screen region size acquisition section, and a maximal value and a minimal value of the object position in the orthogonal coordinate system, and then corrects the display position of the video by using the in-image positional information of the object.

3. The image display controlling apparatus according to claim 2, wherein, the image analysis section identifies an object size in each frame of the video, the content management unit stores therein the image data of the video, the positional information of the object, in-image positional information of the object, and information on the object size analyzed by the image analysis section, by associating with one another on the frame-by-frame basis, the display position determination section calculates a scaling rate for each frame of the video, using the object size outputted by the image analysis section, so that the displayed object is maintained in a constant size, and the display device controlling section transmits a signal to the display device to display, at the display position determined by the display position determination section, the video scaled up or down at the scaling rate determined by the display position determination section.

4. The image display controlling apparatus according to claim 2, wherein, the image analysis section identifies the object size in each frame of the video, the content management unit stores therein the image data of the video, the positional information of the object, the in-image positional information of the object, information on the object size analyzed by the image analysis section, and a zoom value of the video, by associating with one another on the frame-by-frame basis, the display position determination section calculates scaling rate of each frame of the video, by using the object size outputted by the image analysis section, and the zoom value, so that the size of the displayed object changes in accordance with a distance from the camera which captures the object, the display device controlling section transmits a signal to the display device to display, at the display position determined by the display position determination section, the video scaled up or down at the scaling rate determined by the display position determination section.

5. The image display controlling apparatus according to claim 2, wherein the position generating section further includes a positional relationship detecting section for detecting a positional relationship between the object and an angle of view of the camera which captures the object, the image analysis section, in a case where the object is not detected within the video, defines as positional information of the object a coordinate, which is outside of a video data region, and corresponds to the positional relationship, based on information on the positional relationship acquired from the positional relationship detecting section.

6. The image display controlling apparatus according to claim 5, wherein the display device controlling section further includes an icon display controlling section for transmitting a signal to the display device to display an icon at a position indicated by the positional information of the object, and the icon display controlling section transmits a signal for displaying the icon, in a case where the image analysis section has failed to detect the object in each frame of the video.

7. An image displaying method for displaying, on a display device, image data of a video in which an object is captured, the image displaying method comprising:

a storing step of storing therein a frame of the video, and positional information described in an orthogonal coordinate system in which a camera, which captures the object, is used as reference, by associating with one another on a frame-by-frame basis;

a display position determining step of determining a display position in each frame of the video by associating a coordinate of the object in a depth direction in the coordinate system with a coordinate of a vertical axis of the display device, and associating a coordinate of the object in a horizontal axis direction in the coordinate system with a coordinate of a horizontal axis of the display device; and a display device controlling step of transmitting a signal to the display device to display the video at the display position determined by the display position determining step.

8. An integrated circuit for displaying, on a display device, image data of a video in which an object is captured, the integrated circuit comprising:

a content management means for storing therein a frame of the video, and positional information described in an orthogonal coordinate system in which a camera, which captures an object, is used as reference, by associating with one another on a frame-by-frame basis;

a display position determining means for determining a display position in each frame of the video by associating a coordinate of the object in a depth direction in the coordinate system with a coordinate of a vertical axis of the display device, and associating a coordinate of the object in a horizontal axis direction in the coordinate system with a coordinate of a horizontal axis of the display device; and a display device controlling means for transmitting a signal to the display device to display the video at the display position determined by the display position determining means.

* * * * *